(12) United States Patent
Omura

(10) Patent No.: US 12,382,942 B2
(45) Date of Patent: Aug. 12, 2025

(54) REEL SEAT AND FISHING ROD INCLUDING SAME

(71) Applicant: FUJI KOGYO CO., LTD., Shizuoka (JP)

(72) Inventor: Kazuhito Omura, Shizuoka (JP)

(73) Assignee: FUJI KOGYO CO., LTD., Shizuoka (JP)

(*) Notice: Subject to any disclaimer, the term of this patent is extended or adjusted under 35 U.S.C. 154(b) by 0 days.

(21) Appl. No.: 18/814,691

(22) Filed: Aug. 26, 2024

(65) Prior Publication Data

US 2025/0089692 A1 Mar. 20, 2025

(30) Foreign Application Priority Data

Sep. 14, 2023 (KR) .......................... 10-2023-0122393
Dec. 27, 2023 (KR) .......................... 10-2023-0192294

(51) Int. Cl.
*A01K 87/06* (2006.01)

(52) U.S. Cl.
CPC ................... *A01K 87/06* (2013.01)

(58) Field of Classification Search
CPC ....................................................... A01K 87/06
See application file for complete search history.

(56) References Cited

U.S. PATENT DOCUMENTS

| | | | |
|---|---|---|---|
| 3,512,293 A * | 5/1970 | Lumbard | A01K 87/06 43/22 |
| 9,832,981 B2 | 12/2017 | Omura | |
| 11,497,202 B2 | 11/2022 | Naito et al. | |
| 2002/0069574 A1* | 6/2002 | Ohmura | A01K 87/06 43/22 |
| 2014/0259862 A1* | 9/2014 | Malcarne | A01K 87/08 43/4.5 |
| 2015/0040463 A1* | 2/2015 | Lin | A01K 87/06 43/22 |
| 2019/0166815 A1* | 6/2019 | Malcarne | A01K 87/06 |

FOREIGN PATENT DOCUMENTS

| | | | | |
|---|---|---|---|---|
| CN | 114631515 A * | 6/2022 | | A01K 87/06 |
| EP | 3075243 A1 * | 10/2016 | | A01K 87/06 |
| EP | 3117705 A1 * | 1/2017 | | A01K 87/06 |
| EP | 0563994 A2 * | 12/2017 | | |

(Continued)

*Primary Examiner* — Christopher P Ellis
(74) *Attorney, Agent, or Firm* — Oblon, McClelland, Maier & Neustadt, L.L.P.

(57) ABSTRACT

A reel seat for mounting a reel and a fishing rod including the reel seat are provided. The reel seat includes a seat body coupled to a rod body of the fishing rod, a movable hood movably coupled to the seat body along a central axis of the rod body and fixing a leg of the reel to the seat body, and a nut connected to the movable hood and threadedly coupled to the seat body. The nut includes a manipulation portion manipulated for rotation, and a plurality of concave portions disposed in the manipulation portion in a circumferential direction of the central axis. Each concave portion is defined by a bottom surface recessed from an outer peripheral surface of the manipulation portion toward the central axis, and a side surface extending from the bottom surface so as to form an obtuse angle with the bottom surface.

13 Claims, 17 Drawing Sheets

(56) References Cited

FOREIGN PATENT DOCUMENTS

| | | | | |
|---|---|---|---|---|
| GB | 2043411 A | * | 10/1980 | ............ A01K 87/06 |
| JP | 2001-61381 A | | 3/2001 | |
| JP | 6373848 B2 | | 8/2018 | |
| JP | 2019033699 A | * | 3/2019 | |
| JP | 6639984 B2 | * | 2/2020 | |
| JP | 6694368 B2 | * | 5/2020 | |
| JP | 6903519 B2 | * | 7/2021 | |
| KR | 10-2009-0098649 A | | 9/2009 | |
| KR | 10-1466540 B1 | | 11/2014 | |
| KR | 10-2016-0117189 A | | 10/2016 | |
| KR | 10-2150338 B1 | | 9/2020 | |
| WO | WO-2023248508 A1 | * | 12/2023 | ............ A01K 87/06 |

\* cited by examiner

REEL SEAT AND FISHING ROD INCLUDING SAME

CROSS-REFERENCE TO RELATED APPLICATION

This application is based upon and claims the benefit of priority from Korean Patent Application No. 10-2023-0122393, filed on Sep. 14, 2023, and Korean Patent Application No. 10-2023-0192294, filed on Dec. 27, 2023, the entire contents of which are incorporated herein by reference.

TECHNICAL FIELD

The present disclosure relates to a reel seat and a fishing rod including the same.

BACKGROUND

In a fishing rod using a reel, a reel seat is attached to a rod body in order to mount the reel to the fishing rod. The reel seat has a fixed hood for fixing one reel leg of the reel to a reel seat body, which the rod body of the fishing rod is inserted into and passes through, and has a male thread of a certain length in a direction, which is opposite to the fixed hood and in which the other reel leg of the reel is fixed. The reel seat includes a movable hood which can be moved in an axial direction of the fishing rod by the rotation of a nut threadedly coupled to the male thread. The movable hood and the fixed hood fixedly support the reel legs, thereby fixing the reel.

Japanese Patent Publication No. 2001-61381 discloses a fishing rod including a movable hood. Referring to FIG. 1, a reel 2 is mounted on a reel seat 3. The reel seat 3 includes a fixed hood 4 fixing one leg 2a of the reel 2, and a movable hood 5 fixing the other leg 2b of the reel 2. The one leg 2a of the reel 2 is covered by the fixed hood 4 and the other leg 2b of the reel 2 is covered by the movable hood 5, whereby the reel 2 is fixed to the reel seat 3. As a nut 6 disposed at one side of the movable hood 5 is rotated, the movable hood 5 can be moved toward or moved away from the fixed hood 4 along a central axis O of a fishing rod 1.

When a user is gripping the reel seat 3 during fishing as shown in FIG. 1, the nut 6 may be rotated unintentionally by a hand, and therefore the looseness in fixing the reel 2 and the reel seat 3 should be prevented. To this end, the nut 6 in the conventional reel seat 3 is distinguished into a hood side portion 6a, on which a user's finger or palm can be positioned during fishing, and an opposite hood side portion 6b, which is gripped when the reel 2 is fixed or unfixed. A knurled portion 6c for preventing slippage between the hand and the nut 6 is formed on an outer peripheral surface of the nut 6.

In the nut 6 of the conventional reel seat 3, to prevent the rotation of the nut 6 during fishing, the hood side portion 6a should be provided so as to have a relatively long length. Furthermore, to facilitate the rotation of the nut 6, the opposite hood side portion 6b should be provided so as to have a relatively long length. Accordingly, the conventional nut 6 has a restriction on providing a compact or lightweight nut.

SUMMARY

Embodiments of the present disclosure solve the aforementioned problems of the prior art technique. Specifically, the object of the embodiments of the present disclosure is to provide a nut, which can easily move a movable hood to facilitate coupling and separation of a reel and a reel seat, and has a lightweight and compact design.

Disclosed embodiments relate to a reel seat for coupling a reel to a rod body of a fishing rod. According to one aspect of the embodiments of the reel seat, the reel seat for mounting a reel having first and second legs to a rod body of a fishing rod includes: a seat body coupled to the rod body, configured to support the first and second legs, and including a fixed hood configured to cover the first leg; a movable hood coupled to the seat body so as to be movable along a central axis of the rod body in an axial direction, and configured to be moved so as to cover the second leg to fix the second leg to the seat body; and a nut connected to the movable hood and threadedly coupled to the seat body so as to be rotatable in a circumferential direction of the central axis.

The nut includes: a connection portion coupled to the movable hood so as to be rotatable in the circumferential direction; a manipulation portion extending from the connection portion and manipulated for rotation of the nut; and a plurality of concave portions disposed in the manipulation portion in the circumferential direction. Each of the plurality of concave portions is defined by: a bottom surface recessed from an outer peripheral surface of the manipulation portion toward the central axis; and a side surface extending from an edge of the bottom surface so as to form an obtuse angle with the bottom surface.

In one embodiment, the side surface may include: a pair of first side surfaces that face each other in the circumferential direction and form an obtuse angle with the bottom surface; and a pair of second side surfaces that face each other in the axial direction and form an obtuse angle with the bottom surface.

In one embodiment, an included angle of the pair of first side surfaces may be in a range of 144 degrees to 150 degrees.

In one embodiment, the plurality of concave portions may be arranged at an equal interval along the circumferential direction.

In one embodiment, the plurality of concave portions may include five concave portions arranged at an equal interval along the circumferential direction, and an included angle of the pair of first side surfaces of the concave portions may be in a range of 144 degrees to 150 degrees.

In one embodiment, the side surface has a trapezoidal shape with an edge adjoining the bottom surface as a short parallel side.

In one embodiment, the movable hood may include an annular portion adjacent to the nut. When viewed in the axial direction, the bottom surface of the concave portion may have a circular arc shape centered on the central axis. A ratio of a radius of the bottom surface to an outer peripheral radius of the annular portion may be in a range of 90% to 93%.

In one embodiment, a length of the manipulation portion in the axial direction may be in a range of 7 mm to 10 mm.

In one embodiment, the movable hood may include an annular portion adjacent to the nut. A difference between an outer peripheral radius of the manipulation portion and an outer peripheral radius of the annular portion may be in a range of 0 mm to 1 mm.

In one embodiment, the reel seat may further include: a lock ring disposed at one side of the nut and coupled to the seat body so as to be movable in the axial direction; and a lock nut coupled to the lock ring so as to be rotatable in the circumferential direction and threadedly coupled to the seat body so as to be rotatable in the circumferential direction. As the lock nut is rotated, the lock ring may press the nut toward the fixed hood in the axial direction.

In one embodiment, a difference between an outer peripheral radius of the manipulation portion and an outer peripheral radius of the lock ring may be in a range of 0 mm to 1 mm.

In one embodiment, the nut may include a plurality of ridges each disposed between neighboring concave portions of the plurality of concave portions and arranged in the circumferential direction.

The disclosed embodiments relate to a fishing rod including the reel seat. The fishing rod according to one embodiment includes a rod body, and the reel seat according to the above-described embodiment coupled to the rod body.

According to the embodiments of the present disclosure, the nut may be provided to easily move the movable hood to facilitate coupling and separation of the reel and the reel seat, and have a lightweight and compact design. Further, according to the embodiments of the present disclosure, since the nut is designed so as to be lightweight and compact, the cost required for manufacturing the nut can be reduced.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Figure 1:
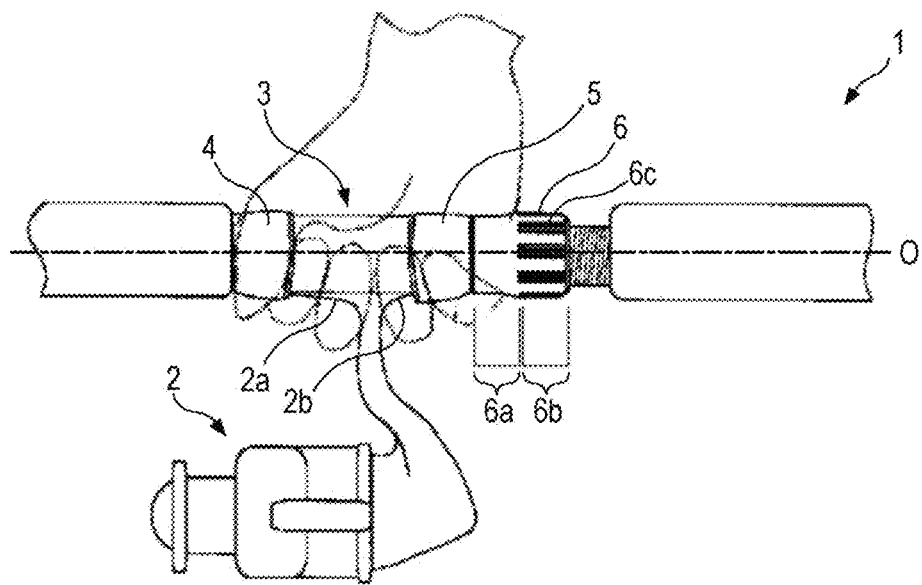
FIG. 1 is a view showing a conventional reel seat.

Embodiments of the present disclosure are illustrated for the purpose of explaining the technical idea of the present disclosure. The scope of the rights according to the present disclosure is not limited to the embodiments presented below or the detailed descriptions of such embodiments.

All technical terms and scientific terms used in the present disclosure include meanings that are commonly understood by those of ordinary skill in the technical field to which the present disclosure pertains unless otherwise defined. All terms used in the present disclosure are selected for the purpose of describing the present disclosure more clearly, and are not selected to limit the scope of the rights according to the present disclosure.

Expressions such as "comprising," "including," "having," and the like used in the present disclosure are to be understood as open-ended terms having the possibility of encompassing other embodiments, unless otherwise mentioned in the phrase or sentence containing such expressions.

Singular expressions described in the present disclosure may encompass plural expressions unless otherwise stated, which will also apply to singular expressions recited in the claims.

Expressions such as "first," "second," etc. used in the present disclosure are used to distinguish a plurality of elements from one another, and are not intended to limit an order or importance of the elements.

In the present disclosure, the description that one element is "connected" or "coupled" to another element should be understood to indicate that the aforesaid one element may be directly connected or coupled to the aforesaid another element, and should be further understood that the aforesaid one element may be connected or coupled to the aforesaid another element via a new element.

The dimensional and numerical values described in the present disclosure are not limited only to the dimensional and numerical values that are described herein. Unless specified otherwise, the dimensional and numerical values may be understood to mean the described values and equivalent ranges including the values. For example, a dimension of "7 mm" described in the present disclosure may be understood to include "about 7 mm."

The directional terms "upward," "upper," and the like used in the present disclosure are based on a direction in which a reel is positioned with respect to a reel seat in the accompanying drawings, while the directional terms "downward," "lower," and the like mean a direction opposite to the upward or upper direction. The reel and the reel seat shown in the accompanying drawings may be oriented differently, and the directional terms may be construed accordingly.

Hereinafter, the embodiments of the present disclosure are described with reference to the accompanying drawings. Like reference numerals in the accompanying drawings denote like or corresponding elements. Further, in the following description of the embodiments, redundant descriptions for the same or corresponding elements may be omitted. However, even if the descriptions of the elements are omitted, such elements are not intended to be excluded in any embodiment.

Figure 2:
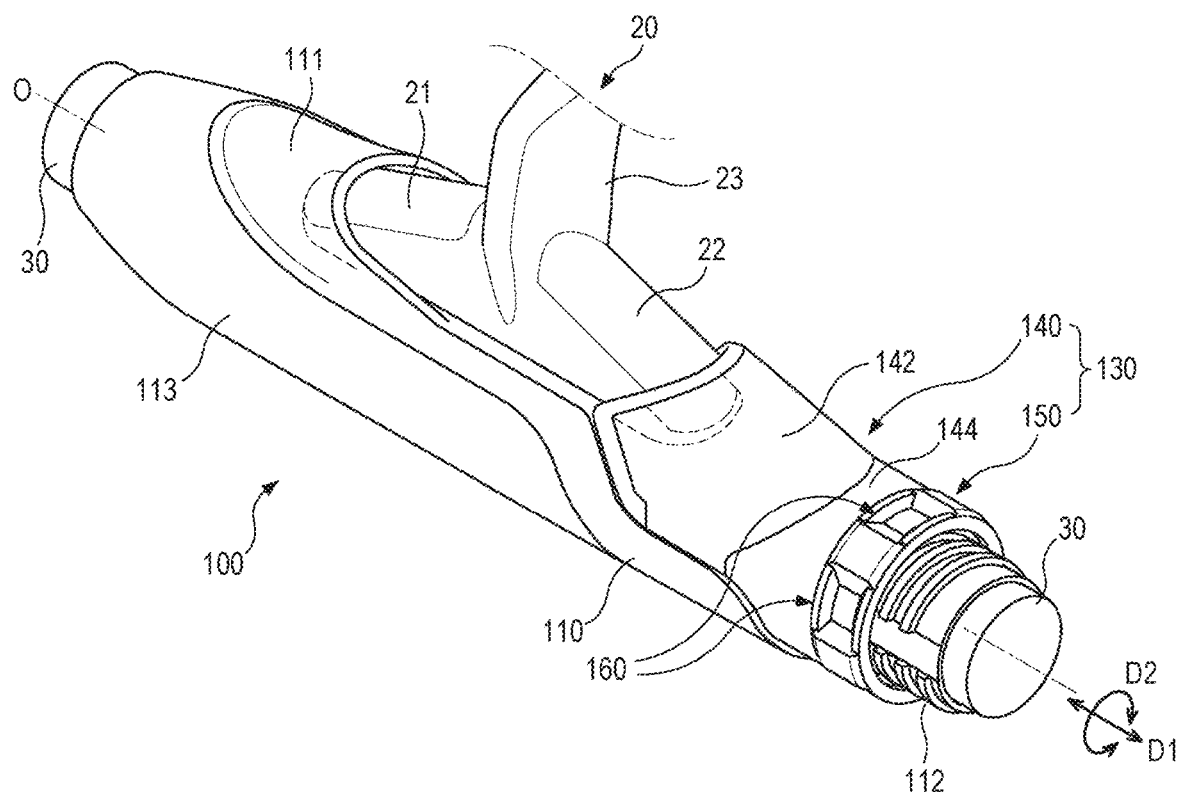
FIG. 2 is a view showing a reel seat according to one embodiment.
Figure 3:
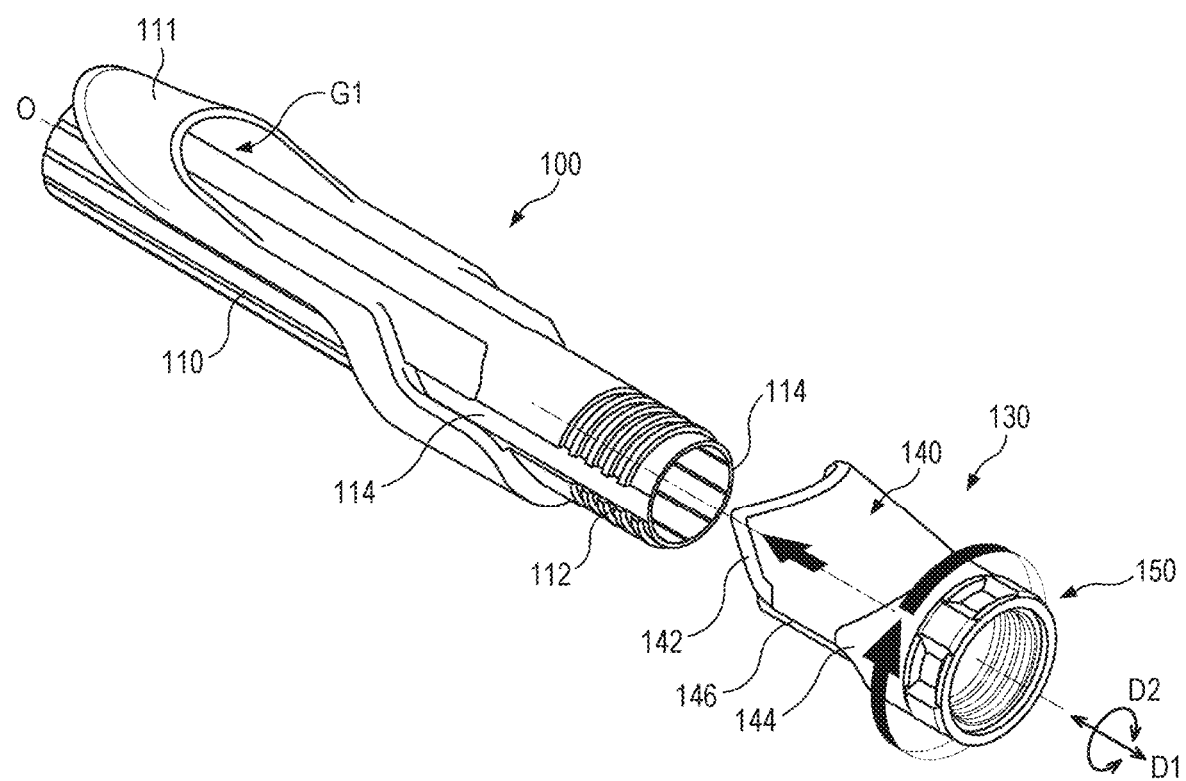
FIG. 3 is a view showing a process of assembling a movable hood to a seat body in one embodiment.
Figure 4:
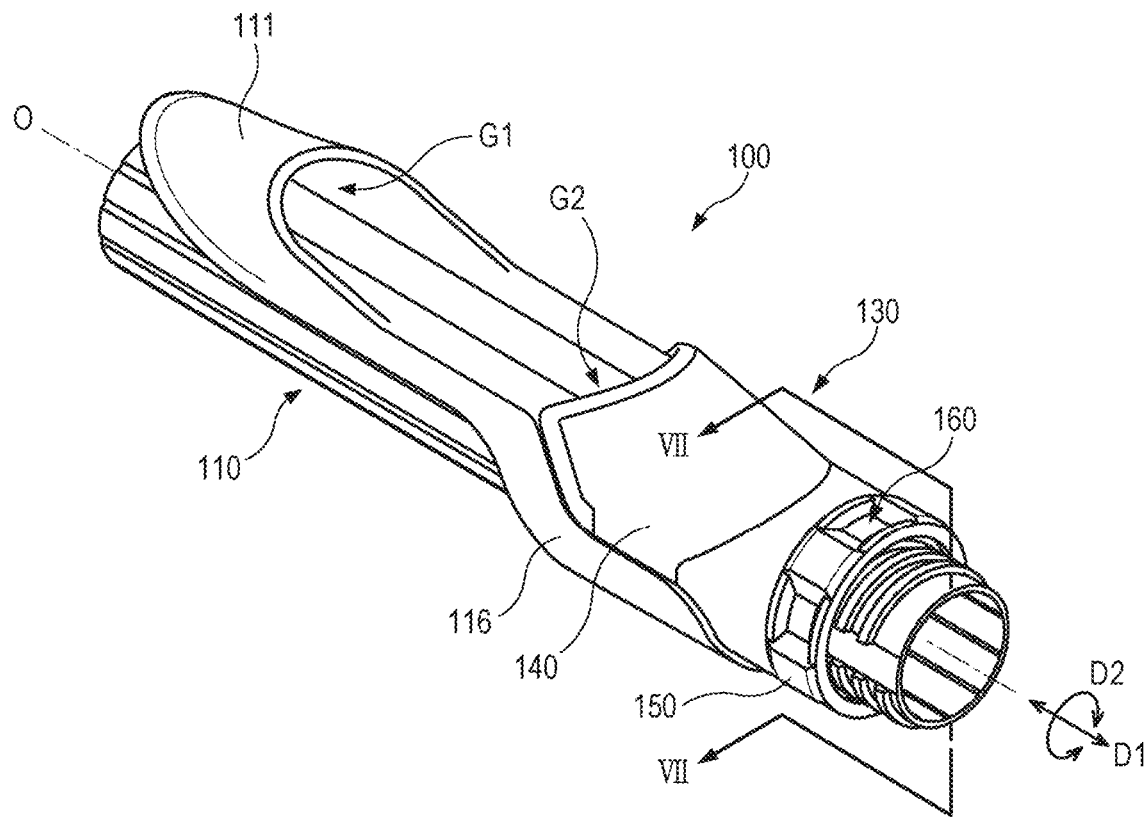
FIG. 4 is a view showing a state where the movable hood is assembled to the seat body in one embodiment.
Figure 5:
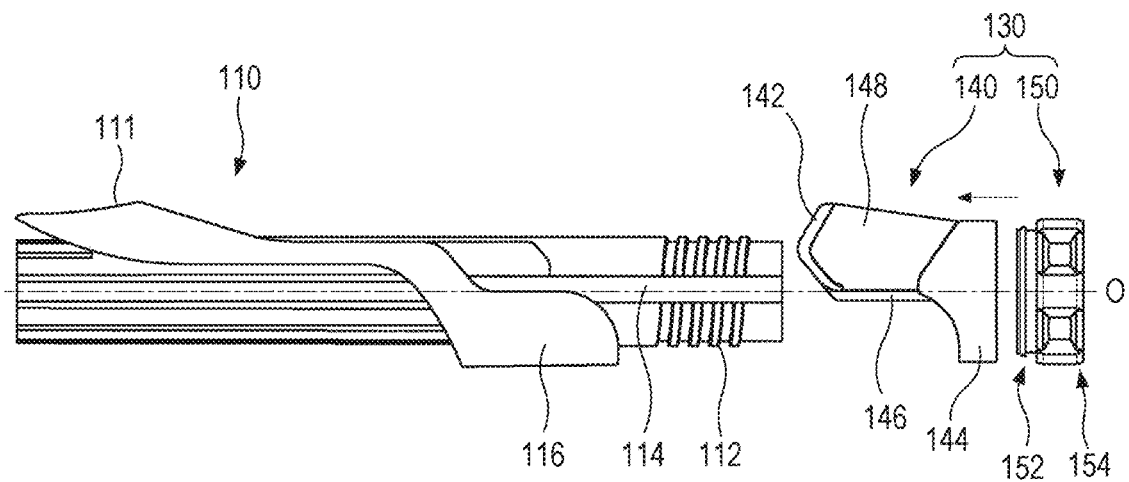
FIG. 5 is a view showing a connection of a nut and a movable hood in one embodiment.
Figure 6:
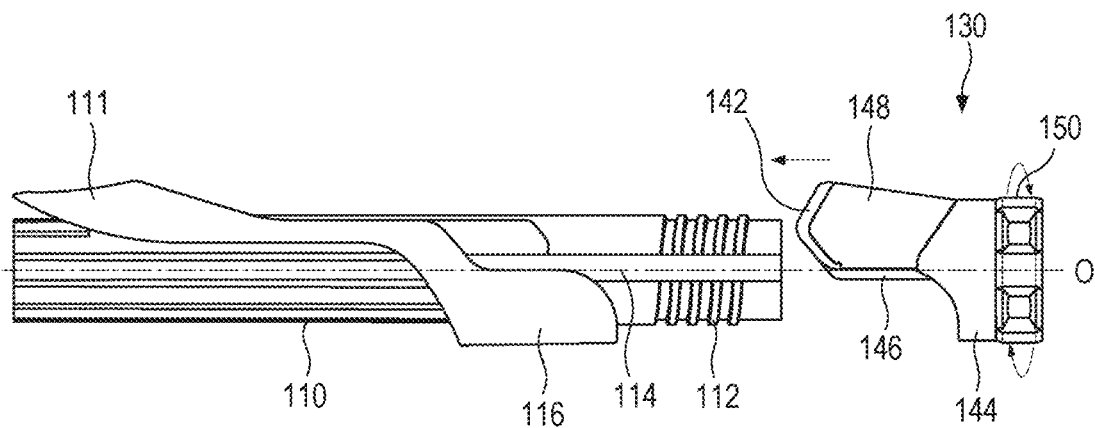
FIG. 6 is a side view showing a process of assembling the movable hood to the seat body in one embodiment.
Figure 7:
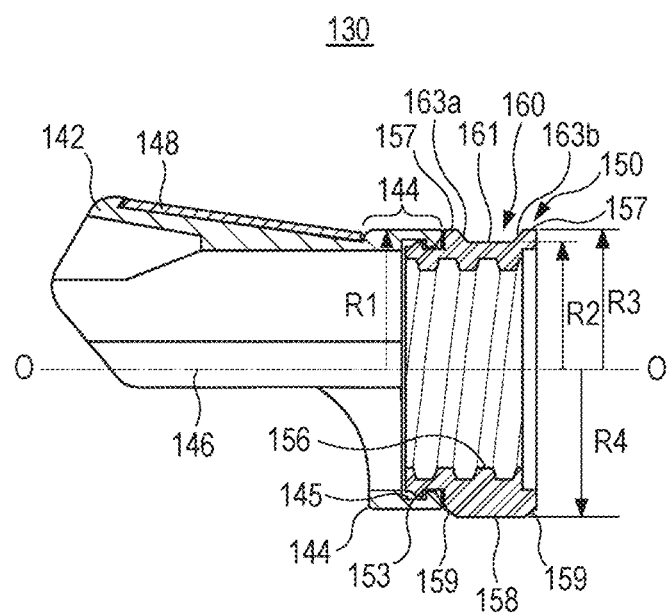
FIG. 7 is a cross-sectional view of the movable hood assembly of FIG. 4 along line VII-VII of FIG. 4.

FIG. 2 is a view showing a reel seat 100 according to one embodiment. FIG. 3 is a view showing a process of assembling a movable hood assembly 130 to a seat body 110 in one embodiment. FIG. 4 is a view showing a state where the movable hood assembly 130 is assembled to the seat body 110 in one embodiment. FIG. 5 is a view showing a connection of a nut 150 and a movable hood 140 in one embodiment. FIG. 6 is a side view showing a process of assembling the movable hood 140 to the seat body 110 in one embodiment. FIG. 7 is a cross-sectional view of the movable hood assembly 130 of FIG. 4 along line VII-VII of FIG. 4.

Referring to FIG. 2, a reel seat 100 is configured to fix a reel 20 to a fishing rod. The reel 20 includes a support 23 extending toward the reel seat 100 and a pair of reel legs 21 and 22 extending from a lower end of the support 23 oppositely from each other in an axial direction D1. The pair of reel legs 21 and 22 are coupled to the reel seat 100, thereby fixing the reel 20 to the fishing rod. The pair of reel legs 21 and 22 include a first leg 21 extending toward a fixed hood 111 of the fishing rod with reference to the support 23 of the reel 20, and a second leg 22 extending in a direction opposite to the first leg 21 (or toward a movable hood 140).

The reel seat 100 includes a seat body 110 coupled to a rod body 30. The seat body 110 is configured to support the pair of reel legs 21 and 22.

The reel seat 100 may include a grip 113 coupled to the seat body 110. The grip 113 may be configured such that a portion of the seat body 110 is inserted into the grip. The grip 113 may be configured such that there is no step difference at a boundary between the grip and the seat body 110 when the grip 113 is coupled to the seat body 110.

The fixed hood 111 and a movable hood assembly 130 fix the reel legs 21 and 22 to the seat body 110. The seat body 110 includes the fixed hood 111 configured to cover the first leg 21 of the pair of reel legs 21 and 22. The fixed hood 111 may be formed integrally with the seat body 110, or may be coupled to the seat body 110 after being provided as a member separate from the seat body 110.

The movable hood assembly 130 includes a movable hood 140 configured to cover the second leg 22 of the pair of reel legs 21 and 22, and a nut 150 configured to move the movable hood 140 along a central axis O (or in the axial direction D1). The movable hood 140 is coupled to the seat body 110 so as to be movable in the axial direction D1. As the movable hood 140 is moved so as to cover the second leg 22, the second leg is fixed to the seat body 110.

In the present disclosure, the description that the hoods 111 and 140 cover the reel legs 21 and 22 means that the hoods are disposed on at least a portion of the reel legs 21 and 22 and at least a portion of the reel legs 21 and 22 and at least a portion of the hoods 111 and 140 overlap with each other in a vertical direction.

Referring to FIGS. 2 to 4, a first gap G1 is present below the fixed hood 111. When an end portion of the first leg 21 is accommodated in the first gap G1, the fixed hood 111 covers the end portion of the first leg 21. A second gap G2 is present between the movable hood 140 and the seat body 110. An end portion of the second leg 22 is accommodated in the second gap G2, and the movable hood 140 covers the end of the second leg 22.

The fixed hood 111 and the movable hood 140 can press the reel legs 21 and 22 downward while covering the reel legs 21 and 22. Referring to FIG. 2, the reel legs 21 and 22 may have an inclined surface that gradually descends in a direction away from the support 23, and the hoods 111 and 140 may have a shape that gradually ascends toward the support 23. As the fixed hood 111 and the movable hood 140 approach each other in the axial direction D1 while coming into contact with the inclined surfaces of the reel legs 21 and 22, the fixed hood 111 and the movable hood 140 can press downward the first leg 21 and the second leg 22, respectively. Therefore, the reel legs 21 and 22 can be tightly fitted between the seat body 110 and the hoods 111 and 140, and the reel 20 can be firmly fixed to the reel seat 100.

The movable hood 140 is coupled to the seat body 110 so as to be movable along the central axis O in the axial direction D1. In the present disclosure, the axial direction D1 means a direction parallel to the central axis O of the rod body 30. The movable hood 140 is configured to selectively cover the second leg 22, which is the other of the pair of reel legs 21 and 22, depending on a position of the movable hood on the seat body 110. For example, the movable hood 140 moving toward the fixed hood 111 covers the second leg 22, while the movable hood 140 moving away from the fixed hood 111 does not cover the second leg 22.

The seat body 110 may include, on an outer surface thereof, a guide groove 114 extending in the axial direction D1. Referring to FIG. 3, the guide groove 114 may be provided on each lateral side of the outer surface of the seat body 110. The movable hood 140 includes a guide protrusion 146 accommodated in the guide groove 114. The movable hood 140 may include a pair of guide protrusions 146 which are accommodated in the pair of guide grooves 114, respectively. The guide protrusion 146 extends in the axial direction D1. When the movable hood 140 is coupled to the seat body 110, the guide protrusion 146 is accommodated in the guide groove 114, and therefore, the movement of the movable hood 140 with respect to the seat body 110 is restricted to the axial direction D1.

The nut 150 is coupled to the movable hood 140 and is configured to adjust the position of the movable hood 140 along the central axis O. The nut 150 is configured to be moved along the central axis O on the seat body 110 by its rotation around the central axis O. The nut 150 may be threadedly coupled to the seat body 110 so as to be rotatable in a circumferential direction D2 of the central axis O. The seat body 110 includes, on an outer peripheral surface thereof, a male thread 112 having a rotation axis in the central axis O, and the nut 150 may be threadedly coupled to the male thread 112. The nut 150 may include, on an inner peripheral surface thereof, a female thread 156 that is engaged with the male thread 112 of the seat body 110. Due to interaction of the male thread 112 and the female thread 156, the nut 150 can be moved along the central axis O on the seat body 110 while being rotated around the central axis O.

Referring to FIGS. 3, 5, and 7, the movable hood 140 may include an annular portion 144 and a hood portion 142 extending from the annular portion 144. The annular portion 144 may have a shape surrounding the outer peripheral surface of the seat body 110. The hood portion 142 extends from an upper semicircle of the annular portion 144 in the axial direction D1. The guide protrusion 146 may be disposed at each of both ends of the hood portion 142 in the circumferential direction D2.

Figure 8:
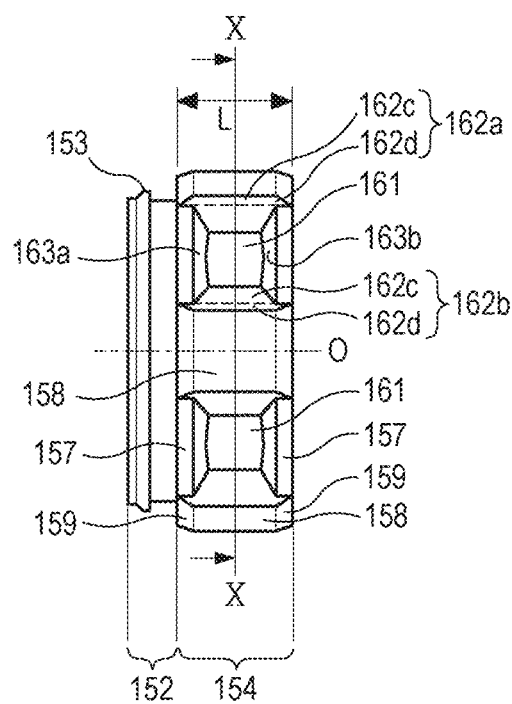
FIG. 8 is a side view of the nut according to one embodiment.

Referring to FIGS. 7 and 8, the annular portion 144 may include, on the inner peripheral surface thereof, an engagement groove 145 formed in the circumferential direction D2. The nut 150 includes a connection portion 152 connected to the movable hood 140. The connection portion 152 may include an engagement protrusion 153, which is formed in the circumferential direction D2 and is accommodated in the engagement groove 145 of the annular portion 144. When the connection portion 152 of the nut 150 is inserted into the annular portion 144, the engagement protrusion 153 is fitted into the engagement groove 145, and therefore the nut 150 is rotatably coupled to the movable hood 140.

By rotation of the nut 150 rotatably coupled to the movable hood 140, the movable hood 140 can be moved along the central axis O on the seat body 110 together with the nut 150. For example, when the nut 150 is rotated in a clockwise direction, the movable hood assembly 130 advances toward the fixed hood 111. When the nut 150 is rotated in a counterclockwise direction, the movable hood assembly 130 retracts from the fixed hood 111. In the present disclosure, the clockwise direction and the counterclockwise direction mean a clockwise rotation direction and a counterclockwise rotation direction, respectively, when the reel seat 100 is viewed from the movable hood 140 toward the fixed hood 111 along the axial direction D1. Further, in the present disclosure, the term "advance" with regard to the movements of the movable hood 140, the nut 150, and the like in the axial direction D1 means the movement in the direction where the movable hood 140 is moved toward the fixed hood 111, and the term "retract" means the movement in the direction where the movable hood 140 is moved away from the fixed hood 111.

The seat body 110 may include a projecting portion 116 which is disposed below the hood portion 142 when the movable hood 140 is moved toward the fixed hood 111. That is, the projecting portion 116 of the seat body 110 is disposed so as to be located adjacent to the hood portion 142 of the movable hood 140 in the circumferential direction D2. When the movable hood 140 is moved toward the fixed hood 111 and the hood portion 142 is partially disposed above the projecting portion 116, at least a portion of the guide protrusion 146 is covered by the projecting portion 116 and may not be exposed to an outside of the reel seat 100.

The movable hood 140 may include a reinforcing cover 148 preventing deformation of the movable hood 140 and the guide protrusion 146. The reinforcing cover 148 surrounds the outside of the movable hood 140 and the guide protrusion 146. The reinforcing cover 148 may be made of a material having rigidity higher than a material of the movable hood 140 or the guide protrusion 146. For example, the movable hood 140 and the guide protrusion 146 may be made of plastic, and the reinforcing cover 148 may be made of metal such as aluminum or stainless steel.

Figure 9:
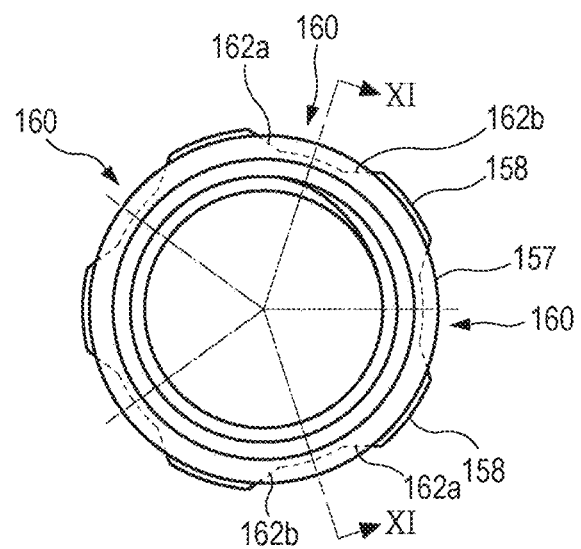
FIG. 9 is a front view of the nut according to one embodiment.
Figure 10:
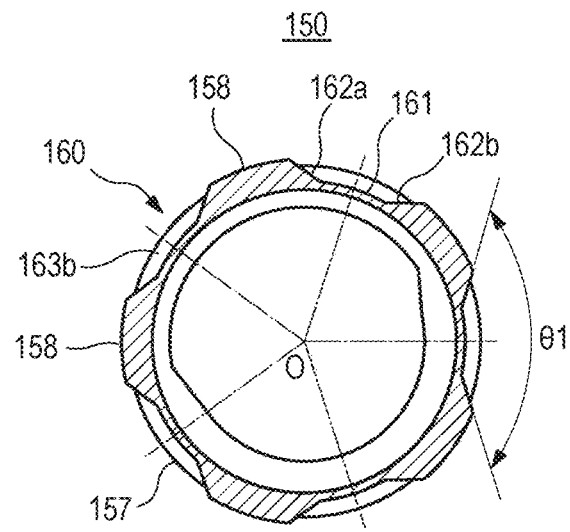
FIG. 10 is a cross-sectional view of the nut of FIG. 8 along line X-X of FIG. 8.
Figure 11:
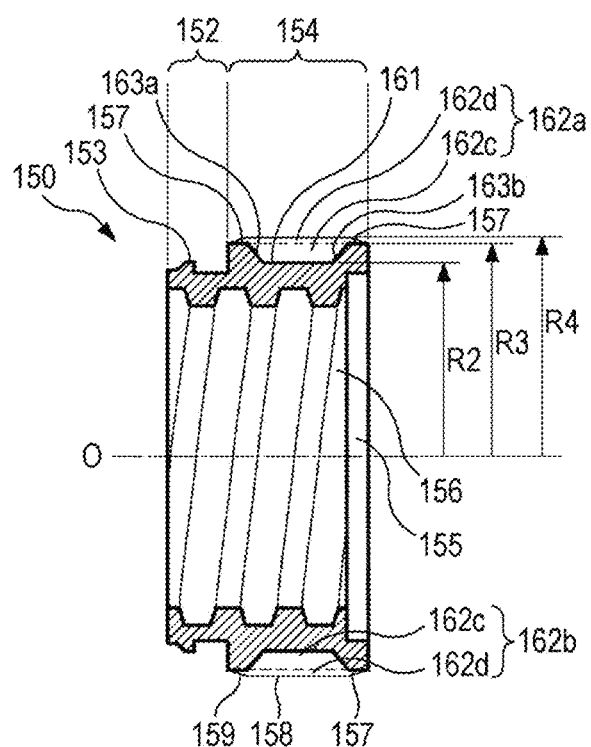
FIG. 11 is a cross-sectional view of the nut of FIG. 9 along line XI-XI of FIG. 9.

FIG. 8 is a side view of the nut 150 according to one embodiment. FIG. 9 is a front view of the nut 150 according to one embodiment. FIG. 10 is a cross-sectional view of the nut 150 of FIG. 8 along line X-X of FIG. 8. FIG. 11 is a cross-sectional view of the nut 150 of FIG. 9 along line XI-XI of FIG. 9.

Referring to FIG. 8, the nut 150 may be provided in a generally annular shape. The nut 150 includes the connection portion 152 and a manipulation portion 154 extending from the connection portion 152. The connection portion 152 is configured to be coupled to the movable hood 140 so as to be rotatable in the circumferential direction D2. The manipulation portion 154 is a portion that is manipulated for rotation of the nut 150. The manipulation portion 154 is exposed to the outside of the reel seat 100 and can be gripped by a user.

The manipulation portion 154 of the nut 150 may have a generally cylindrical shape. In the drawings of the present disclosure, the manipulation portion 154 of the nut 150 has a cylindrical shape having a constant radius along the axial direction D1, but embodiments of the present disclosure are not limited thereto. In other embodiments, the manipulation portion 154 of the nut 150 may have a conical shape, the radius of which changes along the axial direction D1.

A plurality of concave portions 160 are disposed in the manipulation portion 154 of the nut 150 in the circumferential direction D2. Referring to FIGS. 7 and 8, each concave portion 160 may be defined by a bottom surface 161, which is recessed from an outer peripheral surface 157 of the manipulation portion 154 toward a center of the nut 150, and a side surface extending from an edge of the bottom surface 161.

Referring to FIGS. 8 to 11, the side surface of the concave portion 160 may include a pair of first side surfaces 162a and 162b extending from both edges of the bottom surface 161 in the circumferential direction D2, respectively, and a pair of second side surfaces 163a and 163b extending from both edges of the bottom surface 161 in the axial direction D1, respectively. The pair of first side surfaces 162a and 162b face each other in the circumferential direction D2, and the pair of second side surfaces 163a and 163b face each other in the axial direction D1. The pair of first side surfaces 162a and 162b may extend in the axial direction D1, and the pair of second side surfaces 163a and 163b may extend in the circumferential direction D2.

When viewed in the axial direction D1, the concave portion 160 has a shape recessed in a direction toward the central axis O. Referring to FIG. 10, the concave portion 160 may be partially defined by the bottom surface 161 and the pair of first side surfaces 162a and 162b. The bottom surface 161 is recessed between two protruding surfaces 158 of a plurality of protruding surfaces 158 from the protruding surface 158 toward the central axis O, and the pair of first side surfaces 162a and 162b extend from the bottom surface 161 to both protruding surfaces 158, respectively.

When viewed from a side view, the concave portion 160 has a shape recessed in the direction toward the central axis O. Referring to FIG. 11, the concave portion 160 may be partially defined by the bottom surface 161 and the pair of second side surfaces 163a and 163b. The bottom surface 161 is recessed from the outer peripheral surface 157 toward the central axis O, and the pair of second side surfaces 163a and 163b extend from the bottom surface 161 to both outer peripheral surfaces 157, respectively.

Referring to FIGS. 10 and 11, the side surfaces of the concave portion 160 may extend obliquely from the bottom surface 161. For example, the first side surfaces 162a and 162b and the bottom surface 161 may form an angle larger than 90 degrees, and the second side surfaces 163a and 163b and the bottom surface 161 may form an angle larger than 90 degrees.

Referring to FIG. 8, since the side surfaces of the concave portion 160 are provided obliquely with respect to the bottom surface 161, when the concave portion 160 is viewed from above, each of the side surfaces of the concave portion 160 may have a trapezoidal shape with an edge adjoining the bottom surface as a short parallel side. The trapezoidal shape in the present disclosure is not limited to a trapezoid defined by a strict mathematical definition. The trapezoidal shape may include a shape where one of two parallel sides located opposite to each other in appearance is shorter than the other of them and a distance between a pair of oblique sides each interconnecting both ends of each of the two parallel sides gradually increases from the small parallel side toward the long parallel side. Further, the trapezoidal shape of the present disclosure may include an approximately trapezoidal shape where the sides defining a trapezoid are not straight lines, but curved lines.

Referring to FIGS. 8 and 11, a lower surface 162c of each of the first side surfaces 162a and 162b may have a trapezoidal shape with its edge adjoining the bottom surface 161 as a short parallel side. Each of the second side surfaces 163a and 163b may have a trapezoidal shape with its edge adjoining the bottom surface as a short parallel side.

The side surfaces of the concave portion 160 may extend from the respective edges of the bottom surface 161 so as to form an obtuse angle with the bottom surface 161. The pair of first side surfaces 162a and 162b may extend in such a way that a distance therebetween in the circumferential direction D2 gradually increases in a direction away from the bottom surface 161. The pair of second side surfaces 163a and 163b may extend in such a way that a distance therebetween in the axial direction D1 gradually increases in the direction away from the bottom surface 161.

Since the side surfaces of the concave portion 160 are inclined from the bottom surface 161, a contact area between a user's fingertip and the surfaces defining the concave portion 160 can increase. Therefore, a force may be easily applied to the concave portion 160 by the fingertip in both the circumferential direction D2 and the axial direction D1. Where the side surfaces of the concave portion 160 extend perpendicularly from the bottom surface 161, the contact area between the fingertip and the surface of the concave portion 160 in contact with each other would be reduced, and the fingertip applying a force to the small contact area would be pressed with high pressure, and discomfort such as pain may be caused to the fingertip. As a result, the nut 150 cannot be rotated with a strong force and the movable hood 140 cannot press the reel legs 21 and 22 with a sufficient force. Therefore, there may be a problem that the coupling between the reel 20 and the reel seat 100 becomes unstable. In the concave portion 160 according to one embodiment of the present disclosure, the side surfaces of the concave portion are formed so as to be inclined from the bottom surface 161. Thus, the contact area between a finger and the concave portion 160 increases, and thus, a relatively strong force can be applied to the nut 150 without discomfort. The movable hood 140 can be moved toward the fixed hood 111 by means of the nut 150 such that the movable hood 140 can sufficiently press the reel legs 21 and 22, and this enables the reel 20 to be firmly coupled to the reel seat 100.

Further, since the concave portion 160 of the nut 150 according to one embodiment of the present disclosure is recessed toward the central axis O even when viewed from a side view, a force in the axial direction D1 can be easily applied to the nut 150. Applying the force in the axial direction D1 to the nut 150 can further facilitate the movement of the movable hood 140 in the axial direction D1. For example, when the movable hood 140 is advanced toward the fixed hood 111 by the rotation of the nut 150 in the clockwise direction, pushing the nut 150 toward the fixed hood 111 can advance the movable hood 140 more easily. Further, when the movable hood 140 is retracted from the fixed hood 111 by the rotation of the nut 150 in the counterclockwise direction, pulling the nut 150 in a direction away from the fixed hood can retract the movable hood 140 more easily.

The nut 150 may include the protruding surface 158 having an outer peripheral radius larger than the outer peripheral surface 157. Referring to FIG. 11, each of the first side surfaces 162a and 162b may include the lower surface 162c extending from the bottom surface 161 up to a height of the outer peripheral surface 157, and an upper surface 162d extending from the lower surface 162c to the protruding surface 158. That is, since the protruding surfaces 158 are provided, the heights of the first side surfaces 162a and 162b (i.e., the difference between an outer peripheral radius R4 of the protruding surface 158 and an outer peripheral radius R2 of the bottom surface 161 (R4−R2)) become higher. The first side surfaces 162a and 162b are the surfaces to which the force in the circumferential direction D2 is applied by a fingertip. Thus, as the heights of the first side surfaces 162a and 162b from the bottom surface 161 become higher, a user can stably and strongly apply a force for rotating the nut 150 by means of the fingertip. Further, a torque may be determined in part by the magnitude of a product of the magnitude of a force applied to the second side surfaces 163a and 163b and a distance from the central axis O to a point of application. As the heights of the first side surfaces 162a and 162b become higher, the point of application of the force can be moved away from the central axis O, and therefore, a strong torque can be applied to the nut 150 with a relatively small force.

Referring to FIGS. 7 and 8, the nut 150 may include an inclined surface 159 extending from an end of the protruding surface 158 in the axial direction D1. An outer peripheral radius of the inclined surface 159 gradually decreases from a boundary between the inclined surface 159 and the protruding surface 158 toward an either end of the manipulation portion 154 in the axial direction D1. At the either end of the manipulation portion 154 in the axial direction D1, the outer peripheral radius of the inclined surface 159 may be equal to the outer peripheral radius of the outer peripheral surface 157. The manipulation portion 154 of the nut 150 is in contact with the movable hood 140 (or the annular portion 144 of the movable hood 140). Since the inclined surface 159 is disposed between the movable hood 140 and the protruding surface 158, inconvenience that occurs when a user grips a region between the movable hood 140 and the protruding surface 158 can be eliminated or minimized. Further, the manipulation portion 154 of the nut 150 is in contact with a lock ring 180, which is described later. Since the inclined surface 159 is disposed between the lock ring 180 and the protruding surface 158, inconvenience that occurs when the user grips a region between the lock ring 180 and the protruding surface 158 can be eliminated or minimized.

The plurality of concave portions 160 may be disposed at an equal interval in the circumferential direction D2 of the manipulation portion 154. For example, five concave portions 160 may be disposed at an equal interval in the circumferential direction D2 of the manipulation portion 154. When viewed in the axial direction D1, an angle θ1 formed by the pair of first side surfaces 162a and 162b, that is, an included angle of the pair of first side surfaces 162a and 162b may be in a range of 144 degrees to 150 degrees. Where the included angle θ1 of the pair of first side surfaces 162a and 162b is less than 144 degrees, there may be a problem that metal molds for molding the nut 150 become complicated as described later with reference to FIGS. 12 and 13, and therefore a manufacturing cost of the nut 150 increases. Where the angle θ1 is larger than 150 degrees, there may be a problem that a fingertip slips easily when the concave portions 160 is pushed by the fingertip. Further, where the included angle θ1 of the pair of first side surfaces 162a and 162b is larger than 150 degrees, a large portion of the force pushing the first side surfaces 162a and 162b by the fingertip is directed toward the central axis O. In other words, with regard to the pushing force, the magnitude of the force in the circumferential direction D2 that actually rotates the nut 150 decreases. Therefore, the reel 20 cannot be firmly fixed to the reel seat 100 although the nut 150 is strongly tightened and, on the other hand, the strongly tightened nut 150 cannot be easily loosened.

In one embodiment of the present disclosure, five concave portions 160 are disposed in the circumferential direction D2, but this is only exemplary. In other embodiments, the number of the concave portions 160 may be two to four, or six or more.

When viewed in the axial direction D1, the bottom surface 161 of the concave portion 160 may have a circular arc shape centered on the central axis O. For example, the bottom surface 161 of the concave portion 160 may have the same shape as an outer peripheral surface of a cylinder having its central axis on the central axis O. In this case, a ratio of the radius R2 of the bottom surface 161 of the concave portion 160 to the outer peripheral radius R1 of the annular portion 144 (R2/R1*100) may be in a range of 90% to 93%.

The nut 150 of the present disclosure includes the plurality of concave portions 160 in the outer peripheral surface 157, and the nut 150 can be easily rotated by the fingertip engaging with the concave portion 160. Thus, an overall length of the nut 150 can be shortened, and the nut 150 can be provided in a compact size. A length of the manipulation portion 154 of the nut 150 in the axial direction D1 may be in a range of 7 mm to 10 mm.

An outer peripheral radius of a portion of the manipulation portion 154 of the nut 150, which is adjacent to the movable hood 140, may be equal to the outer peripheral radius of the annular portion 144. A difference between the outer peripheral radius of the manipulation portion 154 of the nut 150 and the outer peripheral radius of the annular portion 144 may be in a range of 0 mm to 1 mm. Referring to FIG. 7, a difference between the outer peripheral radius R3 of the outer peripheral surface 157 of the nut 150 and the outer peripheral radius R1 of the annular portion 144 (R3−R1) may be in the range of 0 mm to 1 mm. As another example, a difference between the outer peripheral radius R4 of the protruding surfaces 158 of the nut 150 and the outer peripheral radius R1 of the annular portion 144 (R4−R1) may be in the range of 0 mm to 1 mm.

Figure 12:
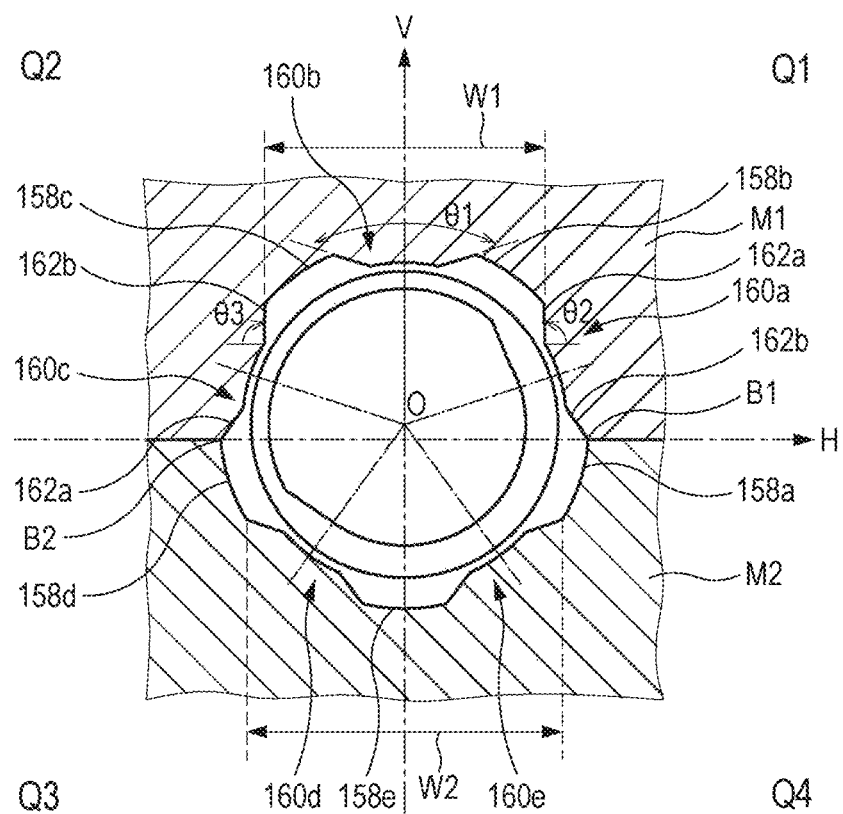
FIG. 12 is a view showing a closed state of a metal mold set for forming the nut according to one embodiment.
Figure 13:
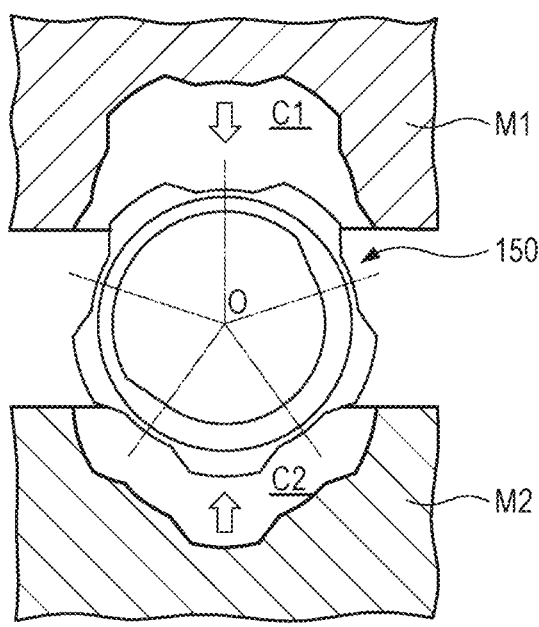
FIG. 13 is a view showing an open state of the metal mold set of FIG. 12.

FIG. 12 is a view showing a closed state of a metal mold set for forming the nut 150 according to one embodiment. FIG. 13 is a view showing an open state of the metal mold set of FIG. 12.

Referring to FIGS. 12 and 13, the nut 150 according to one embodiment may be manufactured using a metal mold set consisting of an upper mold M1 and a lower mold M2. The upper mold M1 and the lower mold M2 may include cavities C1 and C2, respectively, which correspond to a partial shape of the nut 150.

The nut 150 may include five concave portions 160 disposed at an equal interval in the circumferential direction D2. Referring to FIG. 12, the nut 150 may include a first concave portion 160a, a second concave portion 160b, a third concave portion 160c, a fourth concave portion 160d, and a fifth concave portion 160e, which are disposed sequentially in a counterclockwise direction. The nut 150 may include a first protruding surface 158a, a second protruding surface 158b, a third protruding surface 158c, a fourth protruding surface 158d, and a fifth protruding surface 158e, which are disposed sequentially in the counterclockwise direction.

The nut 150 may be formed, by the metal mold set, in such a form that a center of the second concave portion 160b and a center of the fifth protruding surface 158e are aligned on a V-axis. The internal cavities C1 and C2 of the upper and lower molds M1 and M2 may be provided in a form symmetrical with reference to the V-axis.

The upper mold M1 may include the cavity C1 which can form a surface of the nut from a first boundary B1 between the first concave portion 160a and the first protruding surface 158a up to a second boundary B2 between the third concave portion 160c and the fourth protruding surface 158d in the counterclockwise direction. The lower mold M2 may include the cavity C2 which can form the remaining surface of the nut 150, that is, the surface of the nut from the second boundary B2 up to the first boundary B1 in the counterclockwise direction. An H-axis is a horizontal axis interconnecting the first boundary B1 and the second boundary B2.

The included angle θ1 of the pair of first side surfaces 162a and 162b in each of the five concave portions 160 may be in the range of 144 degrees to 150 degrees. Where the angle between the pair of first side surfaces 162a and 162b facing each other in the circumferential direction D2 is 144 degrees or more, in the four quadrants formed by the H-axis and the V-axis, an angle θ2, which any surface of the nut 150 present in the first quadrant Q1 forms with the H-axis, is 90 degrees or more. In particular, an angle, which the first side surface 162a between the bottom surface 161 of the first concave portion 160a and the second protruding surface 158b forms with the H-axis, is not an acute angle. Further, an angle θ3, which any surface of the nut 150 present in the second quadrant Q2 forms with the negative H-axis, is 90 degrees or more. In particular, the angle, which the first side surface 162a between the bottom surface 161 of the third concave portion 160a and the third protruding surface 158c forms with the negative H-axis, is not an acute angle. That is, in the nut 150 formed by the upper mold M1, a width W1 in the H-axis direction monotonically decreases upward (i.e., in a direction of the positive V-axis). Therefore, a portion of the nut 150, which is formed by the upper mold M1 (i.e., a portion located in the first quadrant Q1 and the second quadrant Q2 in the H-V plane), can be easily separated from the upper mold M1 when the cavity C1 of the upper mold M1 is opened. Where the included angle θ1 of the pair of first side surfaces 162a and 162b is less than 144 degrees, the nut 150 would include a portion where the width W1 in the H-axis direction increases upward. In such a case, it is difficult to separate the nut 150 from the upper mold M1 due to interference between the nut 150 and the upper mold M1.

Where the included angle θ1 of the pair of first side surfaces 162a and 162b is 144 degrees or more, a width W2 of the nut 150 in the H-axis direction, which is present in the third quadrant Q3 and fourth quadrant Q4, also monotonically decreases downward (i.e., in a direction of the negative V-axis direction). Therefore, a portion of the nut 150, which is formed by the lower mold M2 (i.e., a portion located in the third quadrant and the fourth quadrant in the H-V plane), can be easily separated from the lower mold M2 when the cavity C2 of the lower mold M2 is opened.

Where the included angle θ1 of the pair of first side surfaces 162a and 162b is 144 degrees or more, the nut 150 can be formed using the metal mold set having a simple structure as shown in FIGS. 12 and 13. This can improve the precision of the metal molds and save the cost of manufacturing and maintaining the metal molds.

Figure 14:
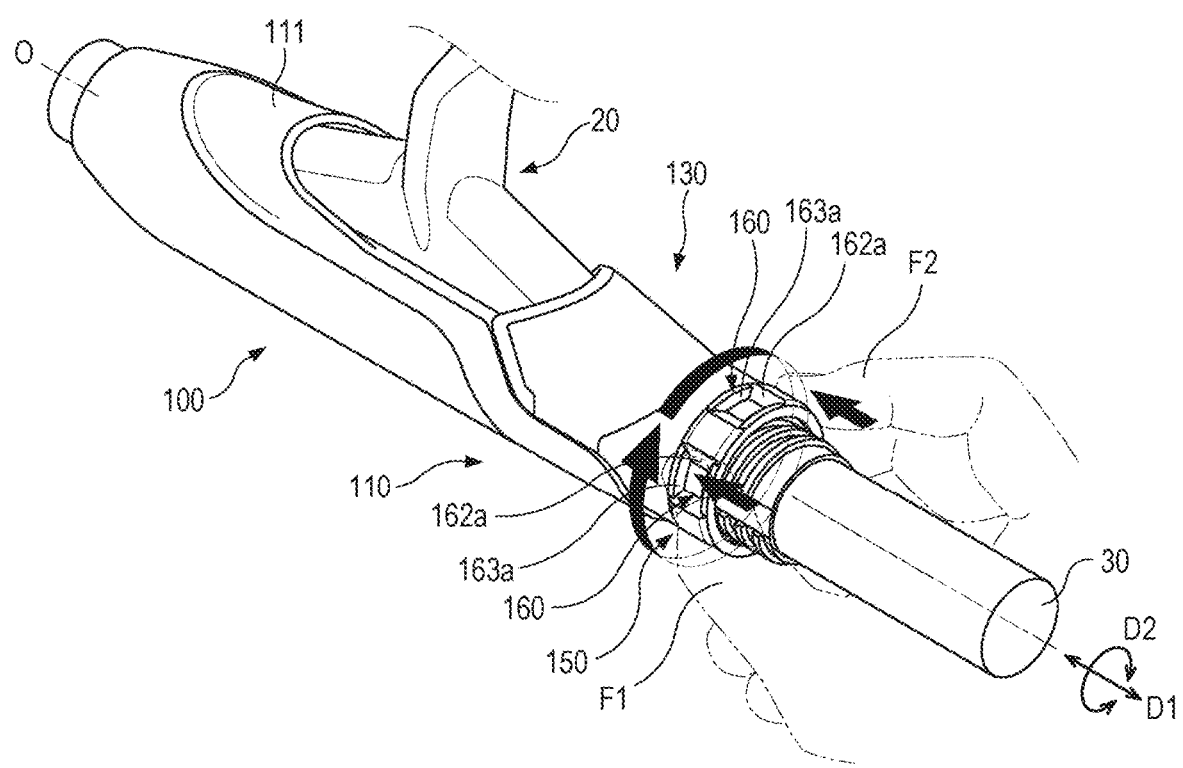
FIG. 14 is a view showing a motion of rotating the nut by means of fingertips to move the movable hood toward the fixed hood.
Figure 15:
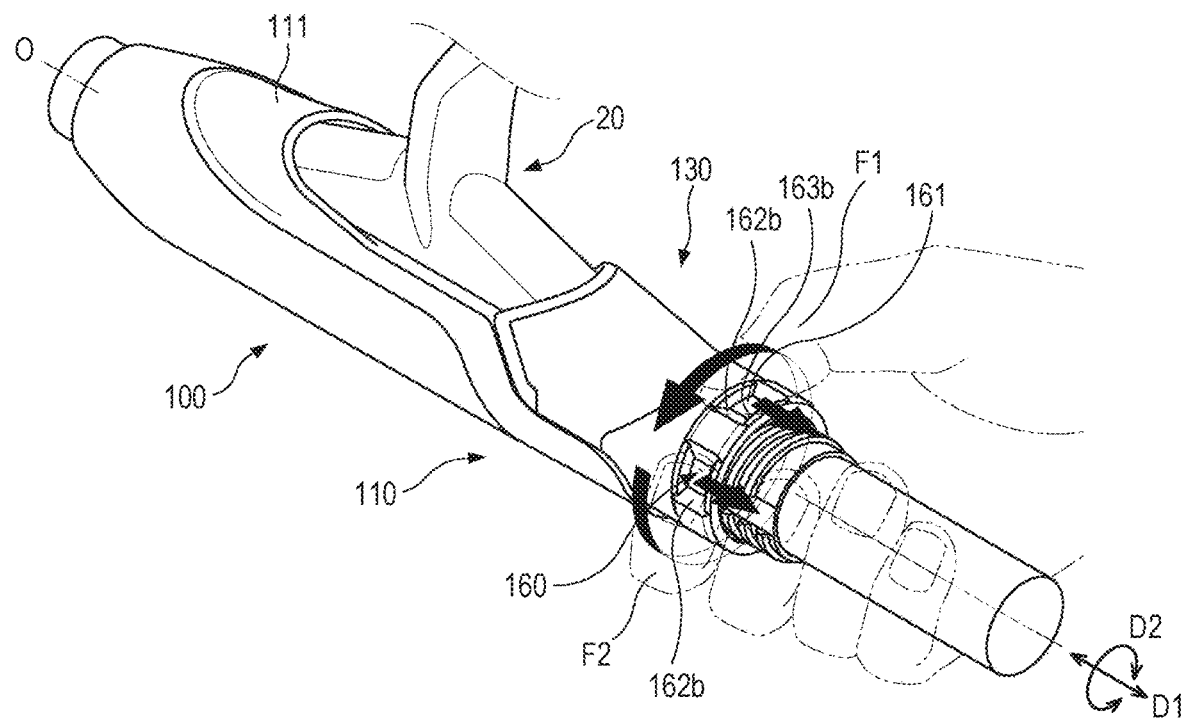
FIG. 15 is a view showing a motion of rotating the nut by means of fingertips to retract the movable hood from the fixed hood.
Figure 16:
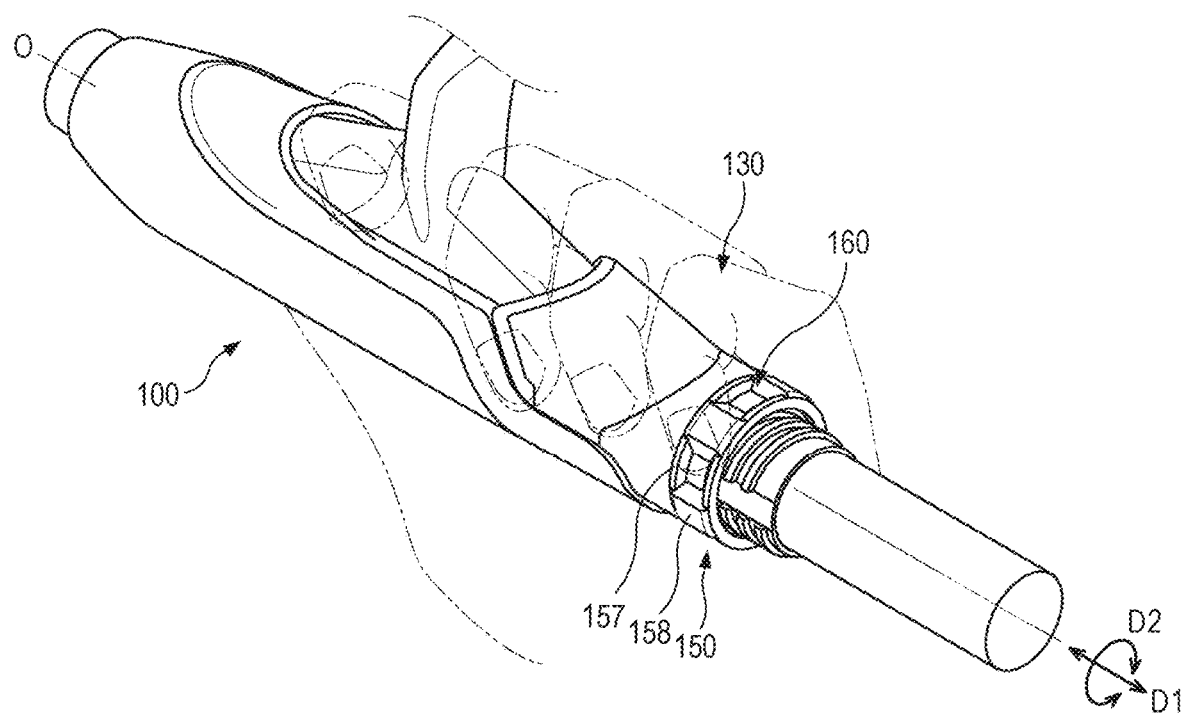
FIG. 16 is a view showing a state where the reel seat according to one embodiment is gripped.

FIG. 14 is a view showing a motion of rotating the nut 150 by means of fingertips to move the movable hood 140 toward the fixed hood 111. FIG. 15 is a view showing a motion of rotating the nut 150 by means of fingertips to retract the movable hood 140 from the fixed hood 111. FIG. 16 is a view showing a state where the reel seat 100 according to one embodiment is gripped.

Referring to FIG. 14, a user positions fingertips of an index finger F2 and a thumb F1 in the concave portions 160 and rotates the nut 150 around the central axis O in the clockwise direction, whereby the movable hood 140 can be advanced. Referring to FIG. 15, the user positions the fingertips of the index finger F2 and the thumb F1 in the concave portions 160 and rotates the nut 150 around the central axis O in the counterclockwise direction, whereby the movable hood 140 can be retracted.

When the fingertip is accommodated in the concave portions 160, the first side surfaces 162a and 162b of the concave portions 160 prevent the fingertip from slipping in the circumferential direction D2 or the axial direction D1. Thus, the force in the circumferential direction D2 and the force in the axial direction D1 can be easily and stably applied to the nut 150. The user can rotate the nut 150 with ease by applying the force in the circumferential direction D2 to the first side surfaces 162a and 162b of the concave portions 160 by means of the fingertips.

The concave portions 160 of the nut 150 have the second side surfaces 163a and 163b that can receive the force in the axial direction D1. Thus, the user can rotate the nut 150 while pushing or pulling the second side surfaces 163a and 163b. That is, the user can simultaneously apply both the force in the circumferential direction D2 and the force in the axial direction D1 to the nut 150 by means of the fingertips. The nut 150 is threadedly coupled to the seat body 110 and is moved in the axial direction D1 when rotated in the clockwise direction. Thus, when the user rotates the nut 150 by means of the fingertips, pushing or pulling the nut 150 in the axial direction D1 is advantageous to the rotation of the nut 150. Moreover, when the nut 150 is rotated, the user's fingertips also move in the axial direction D1 in the state of being accommodated in the concave portion 160 of the nut 150. Thus, when the nut 150 is rotated, it is more comfortable to push or pull the nut 150 in the axial direction D1. According to one embodiment of the present disclosure, since the user can push or pull the nut 150 while rotating the nut 150, it is possible to eliminate or minimize the stress felt by the user while rotating the nut 150.

Referring to FIG. 16, the concave portions 160 are recessed toward the central axis O in comparison with the outer peripheral surfaces 157 or the protruding surfaces 158 of the nut 150. Thus, during fishing, the fingertips or the inner surfaces of fingers may be placed on the outer peripheral surfaces 157 or the protruding surfaces 158 of the nut 150 except the concave portions 160. Therefore, it is possible to prevent the nut 150 from being rotated unintentionally by a finger during fishing.

Figure 17:
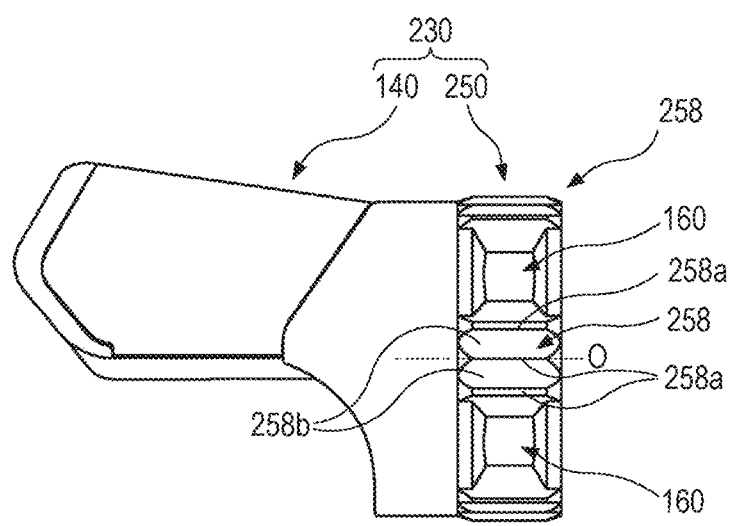
FIG. 17 is a view showing a movable hood assembly according to one embodiment.
Figure 18:
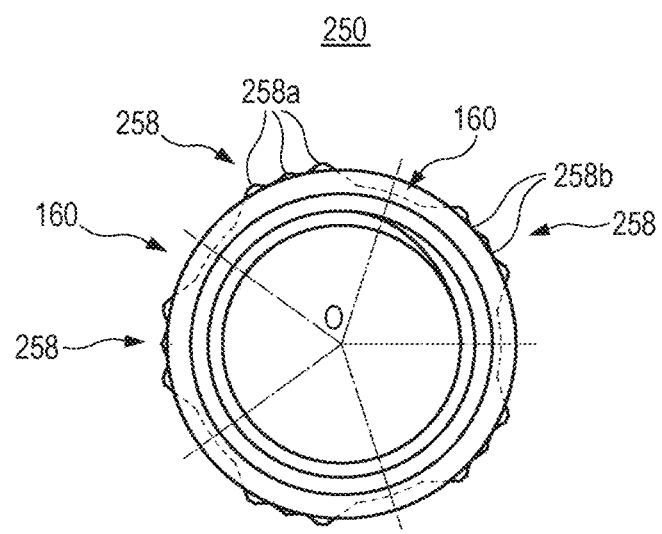
FIG. 18 is a front view of a nut of FIG. 17.
Figure 19:
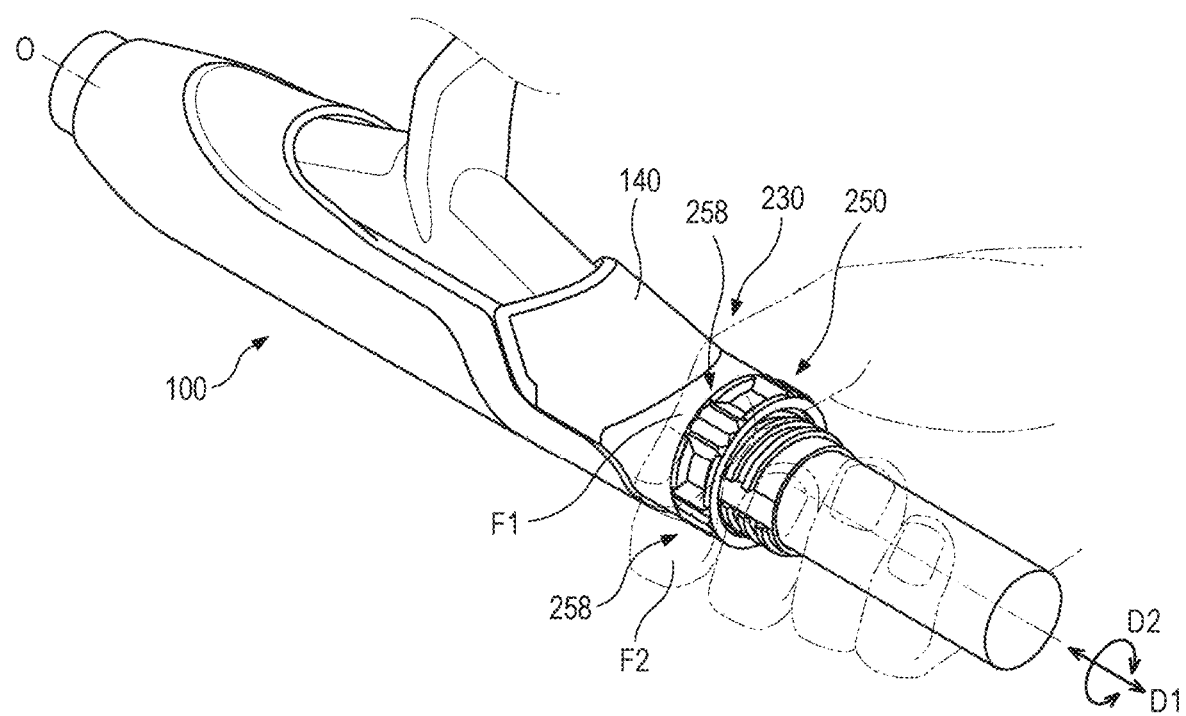
FIG. 19 is a view showing a state where the nut of FIG. 17 is gripped.

FIG. 17 is a view showing a movable hood assembly 230 according to one embodiment. FIG. 18 is a front view of a nut 250 of FIG. 17. FIG. 19 is a view showing a state where the nut 250 of FIG. 17 is gripped.

Referring to FIGS. 17 and 18, the nut 250 may include a knurled portion 258 which is disposed between the neighboring concave portions 160 of the plurality of concave portions 160. The knurled portion 258 may include a plurality of ridges 258a arranged in the circumferential direction D2. The ridges 258a extend in the axial direction D1. The ridges 258a may have a radially convex shape when viewed in the axial direction D1. A groove 258b extending in the axial direction D1 is disposed between the neighboring ridges 258a. In FIGS. 17 and 18, the knurled portion 258 includes three ridges 258a, but this is only exemplary. The number of the ridges 258a may be two or four or more.

Referring to FIG. 19, since the nut 250 includes the knurled portion 258, when the index finger F2 and thumb F1 surround the manipulation portion 154, the friction force between the fingers and the manipulation portion 154 further increases, and the fingers do not slip. Therefore, it is possible to turn the nut 250 with a stronger force by a hand. Further, when the fingertips are positioned in the concave portions 160 during gripping, the friction force between the hand and the nut 250 can be further increased.

Figure 20:
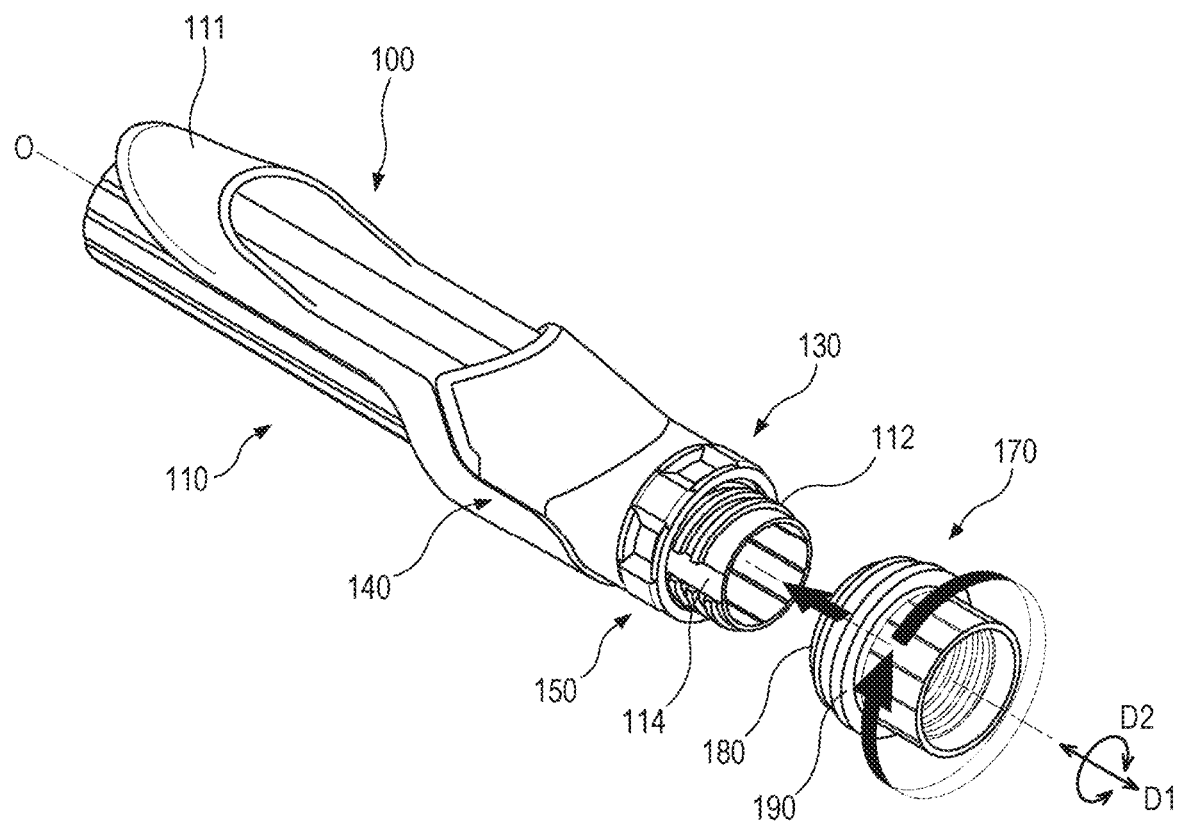
FIG. 20 is a view showing a process of assembling a lock nut assembly to the seat body in one embodiment.
Figure 21:
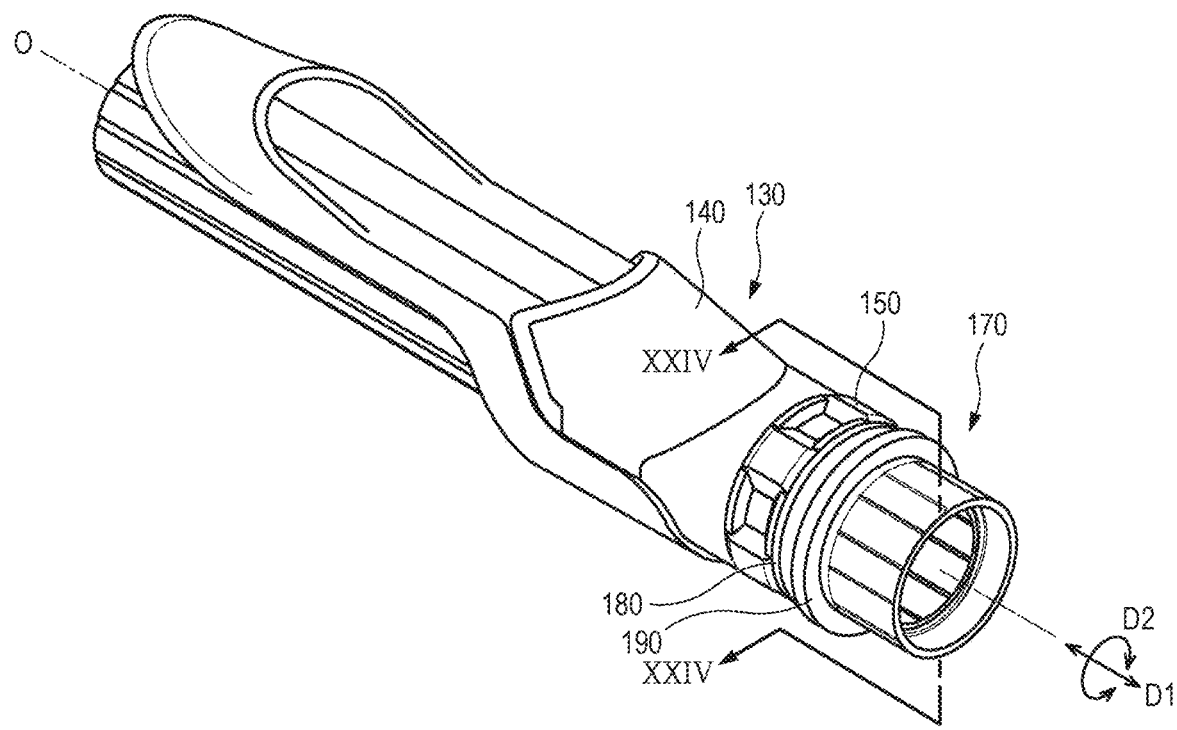
FIG. 21 is a view showing a state where the lock nut assembly is coupled to the seat body in one embodiment.
Figure 22:
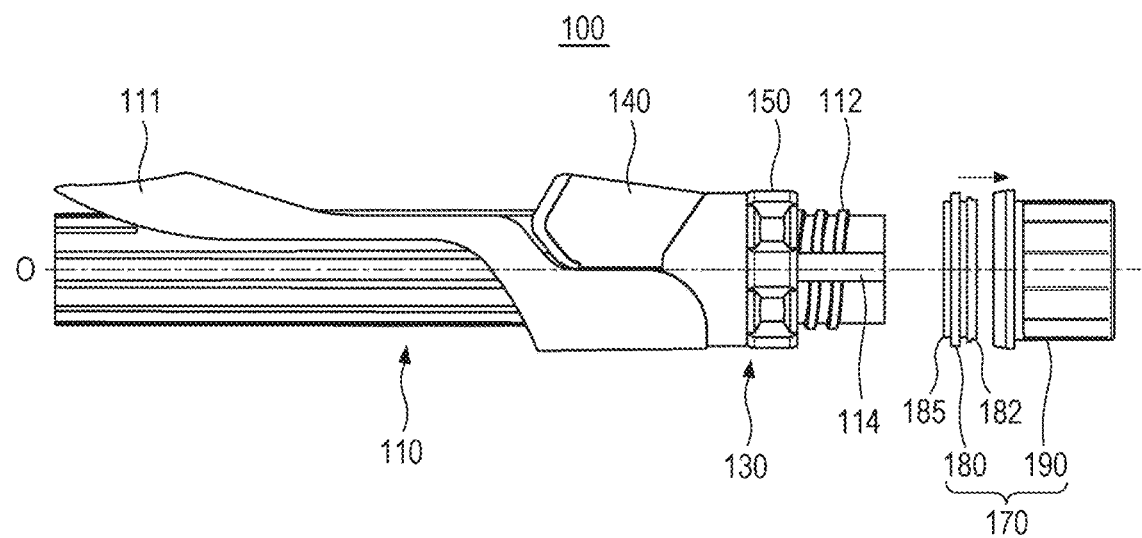
FIG. 22 is a view showing a process of coupling a lock ring to a lock nut in one embodiment.
Figure 23:
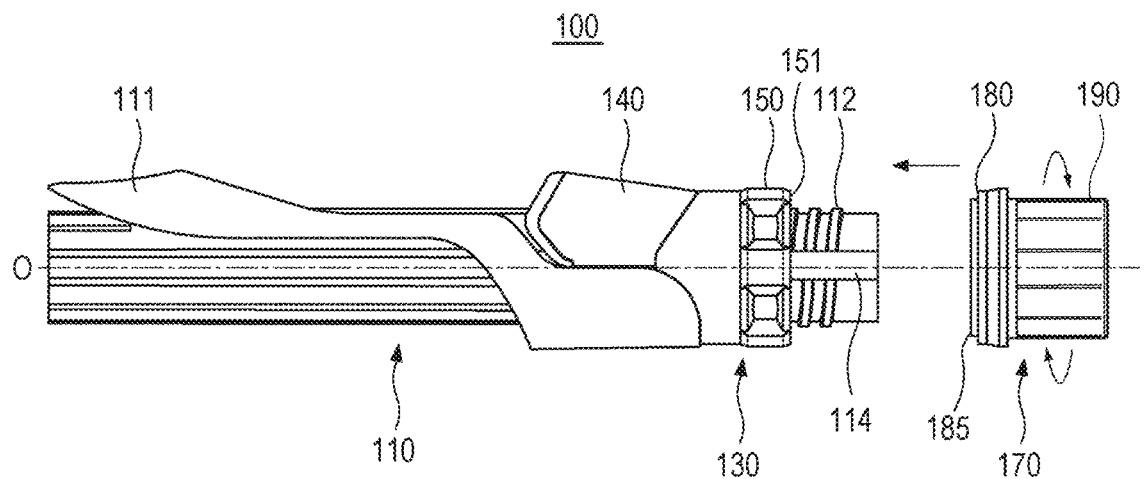
FIG. 23 is a side view showing a process of assembling the lock nut assembly to the seat body in one embodiment.
Figure 24:
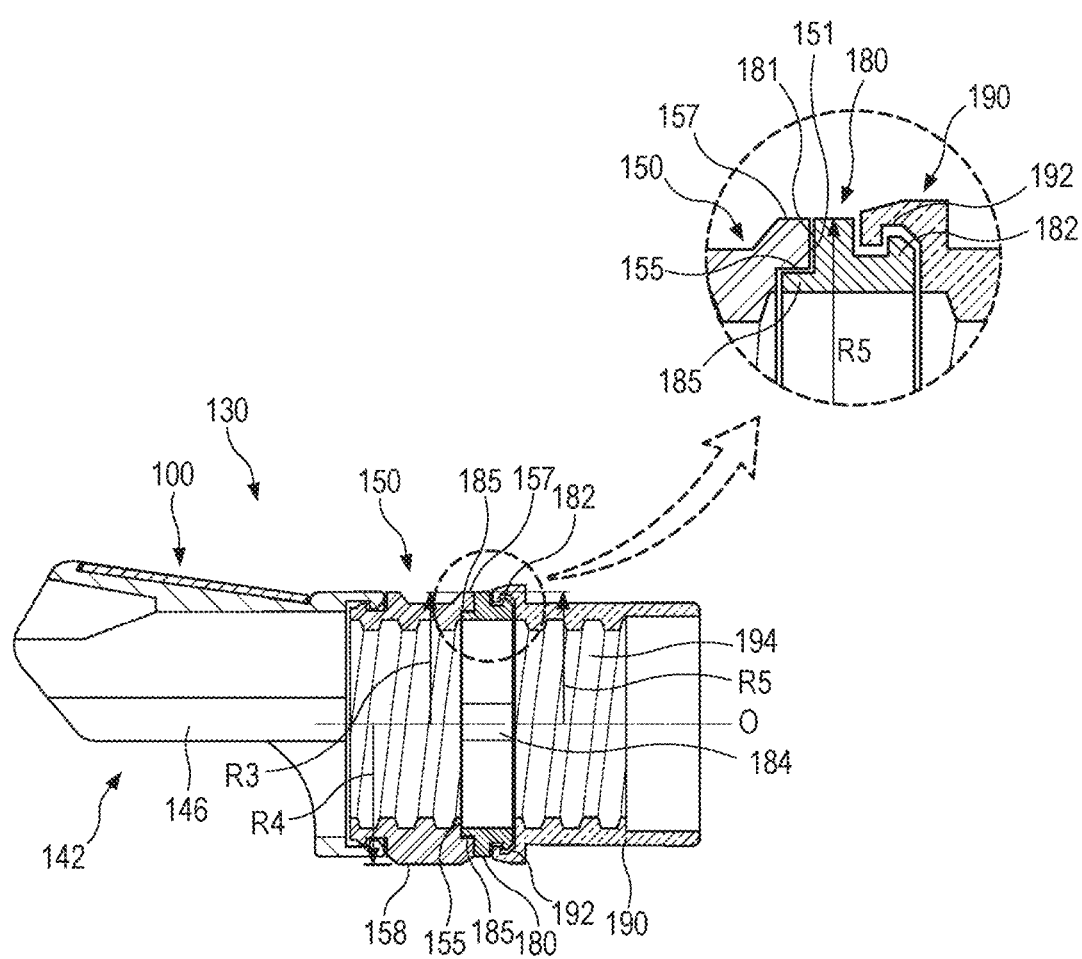
FIG. 24 is a cross-sectional view of the movable hood assembly and the lock nut assembly of FIG. 21 along line XXIV-XXIV of FIG. 21.

FIG. 20 is a view showing a process of assembling a lock nut assembly 170 to the seat body 110 in one embodiment. FIG. 21 is a view showing a state where the lock nut assembly 170 is coupled to the seat body 110 in one embodiment. FIG. 22 is a view showing a process of coupling a lock ring 180 to a lock nut 190 in one embodiment. FIG. 23 is a side view showing a process of assembling the lock nut assembly 170 to the seat body 110 in one embodiment. FIG. 24 is a cross-sectional view of the movable hood assembly 130 and the lock nut assembly 170 of FIG. 21 along line XXIV-XXIV of FIG. 21.

Referring to FIGS. 20 and 21, the reel seat 100 may further include the lock nut assembly 170. The lock nut assembly 170 is coupled to the seat body 110 and is disposed at one side of the movable hood assembly 130. The lock nut assembly 170 is configured to prevent the nut 150 from loosening.

The lock nut assembly 170 includes the lock ring 180 and the lock nut 190. The lock ring 180 is disposed at one side of the nut 150 and is coupled to the seat body 110 so as to be movable in the axial direction D1. Referring to FIG. 22, the lock ring 180 is coupled to the lock nut 190, and the assembly of the lock ring 180 and the lock nut 190, i.e., the lock nut assembly 170, is coupled to the seat body 110.

The lock ring 180 is coupled to the lock nut 190 so as to be rotatable in the circumferential direction D2. Referring to FIGS. 22 and 24, the lock ring 180 may include an engagement protrusion 182 extending in the circumferential direction D2, and the lock nut 190 may include an engagement groove 192 configured to accommodate the engagement protrusion 182 of the lock ring 180. The lock ring 180 is coupled to the seat body 110 so as to be movable in the axial direction D1. Referring to FIG. 24, the lock ring 180 may include, on its inner peripheral surface, a guide protrusion 184 accommodated in the guide groove 114 of the seat body. The guide protrusion 184 of the lock ring 180 may extend in the axial direction D1.

The lock nut 190 is threadedly coupled to the seat body 110 so as to be rotatable in the circumferential direction D2. The lock nut 190 may include, on its inner peripheral surface, a female thread 194, which is threadedly coupled to the male thread 112 formed on the outer peripheral surface of the seat body 110. Referring to FIG. 20, as the lock nut 190 is fitted on the seat body 110 and is rotated in the clockwise direction, the lock nut can be advanced along the male thread 112 of the seat body 110 in the axial direction D1.

The lock ring 180 may include an inserting portion 185 extending in a direction toward the nut 150. The inserting portion 185 is configured to be inserted into the nut 150. The nut 150 includes an accommodating portion 155 configured to accommodate the inserting portion 185. The inserting portion 185 has an outer peripheral radius smaller than the outer peripheral radius R5 of the lock ring 180. When the inserting portion 185 is inserted into the accommodating part 155 of the nut 150, the nut 150 surrounds the inserting portion 185 in the circumferential direction D2.

As the lock nut 190 is rotated around the central axis O, the lock nut 190 is moved in the axial direction D1, and the lock ring 180 is also moved in the axial direction D1 accordingly. Since the guide protrusion 184 of the lock ring 180 is moved along the guide groove 114, the lock ring 180 is moved only in the axial direction D1 without rotation.

Referring to FIGS. 23 and 24, as the lock nut 190 is rotated in the clockwise direction, a frontward surface 181 of the lock ring 180 can be brought into contact with a rearward surface 151 of the nut 150. As the lock nut 190 is strongly turned, the lock ring 180 can strongly push the rearward surface 151 of the nut 150 toward the movable hood 140. To loosen the nut 150, the nut 150 is needed to be moved rearward (i.e., in the direction away from the fixed hood 111). However, in the state where the lock ring 180 is pushing the nut 150, the nut 150 cannot be moved rearward. Therefore, by pushing the nut 150 by the lock ring 180, the nut 150 can be prevented from being loosened from the seat body 110.

An outer peripheral radius of a portion of the manipulation portion 154 of the nut 150, which is adjacent to the lock ring 180, may be equal to an outer peripheral radius of the lock ring 180. A difference between the outer peripheral radius of the manipulation portion 154 of the nut 150 and the outer peripheral radius of the lock ring 180 may be in the range of 0 mm to 1 mm. A difference between the outer peripheral radius R3 of the outer peripheral surface 157 of the nut 150 and the outer peripheral radius R5 of the lock ring 180 (R3−R5) may be in the range of 0 mm to 1 mm. A difference between the outer peripheral radius R4 of the protruding surfaces 158 of the nut 150 and the outer peripheral radius R5 of the lock ring 180 (R4−R5) may be in the range of 0 mm to 1 mm.

Figure 25:
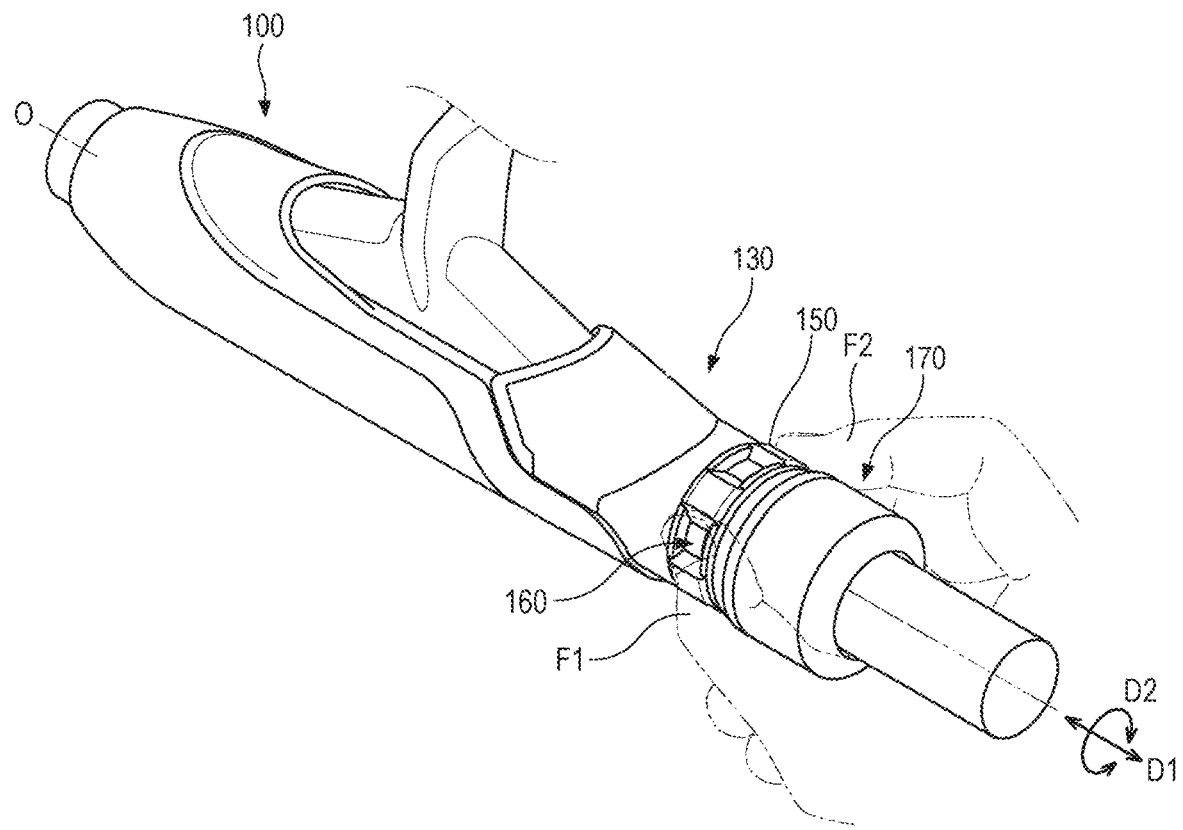
FIG. 25 is a view showing a motion of moving the movable hood toward the fixed hood in a state where the lock nut assembly is coupled to the seat body.
Figure 26:
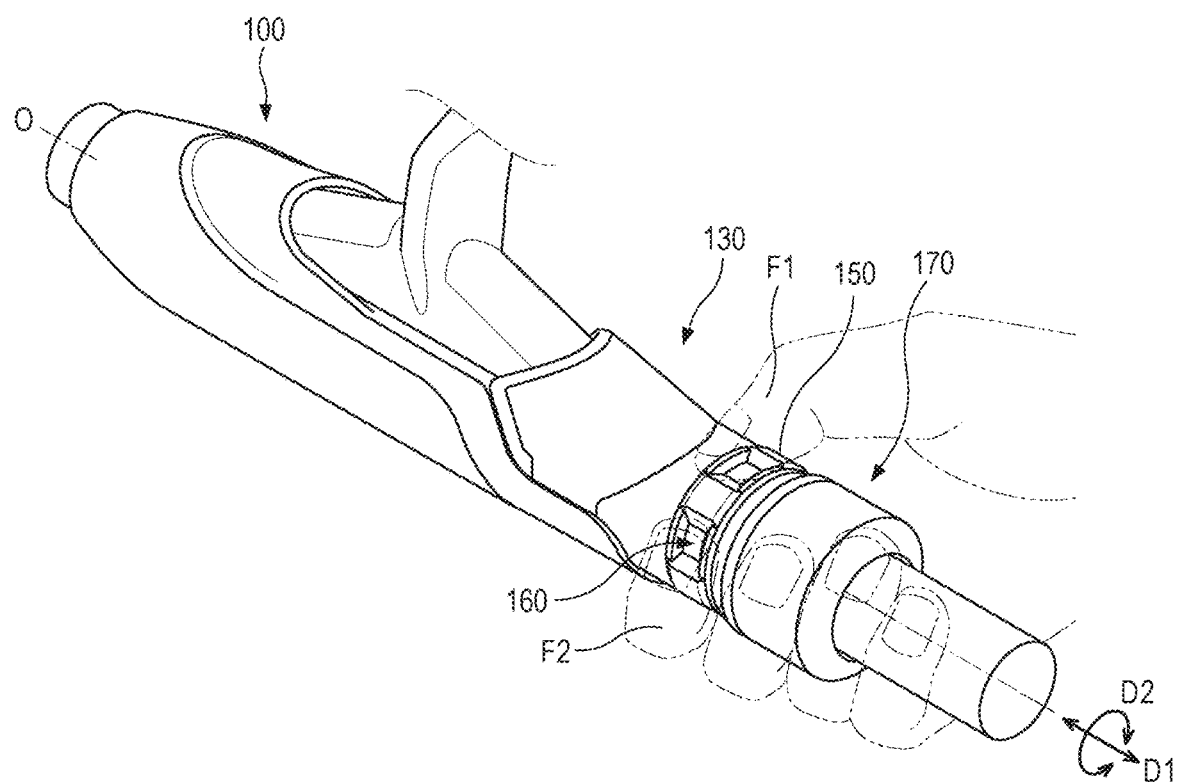
FIG. 26 is a view showing a motion of retracting the movable hood from the fixed hood in the state where the lock nut assembly is coupled to the seat body.

FIG. 25 is a view showing a motion of moving the movable hood 140 toward the fixed hood 111 in a state where the lock nut assembly 170 is coupled to the seat body 110. FIG. 26 is a view showing a motion of retracting the movable hood 140 from the fixed hood 111 in the state where the lock nut assembly 170 is coupled to the seat body 110. Referring to FIGS. 25 and 26, even in the state where the lock nut assembly 170 is assembled to the seat body 110, the nut 150 can be easily rotated. The user can rotate the nut 150 by means of only fingertips by inserting the fingertips to the concave portions 160 of the nut 150 and applying a force in the circumferential direction D2 to the nut 150. Therefore, since the force of the fingers can be concentrated to the concave portions 160 of the nut 150, the user can easily rotate the nut 150 without feeling inconvenience even if the lock nut assembly 170 is close to the nut 150.

Figure 27:
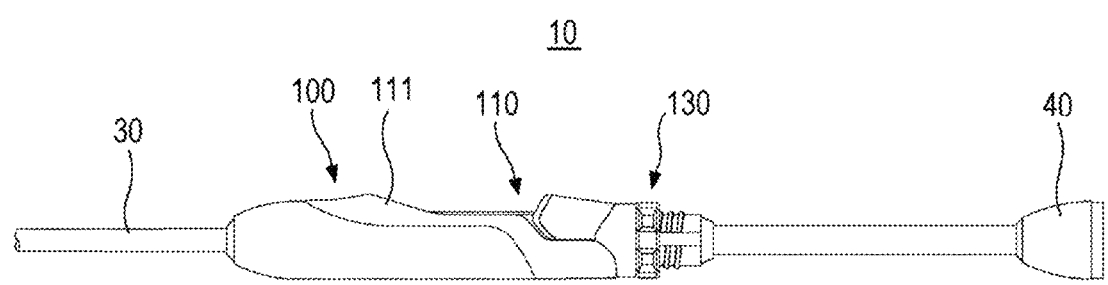
FIG. 27 is a view showing a fishing rod according to one embodiment.
Figure 28:
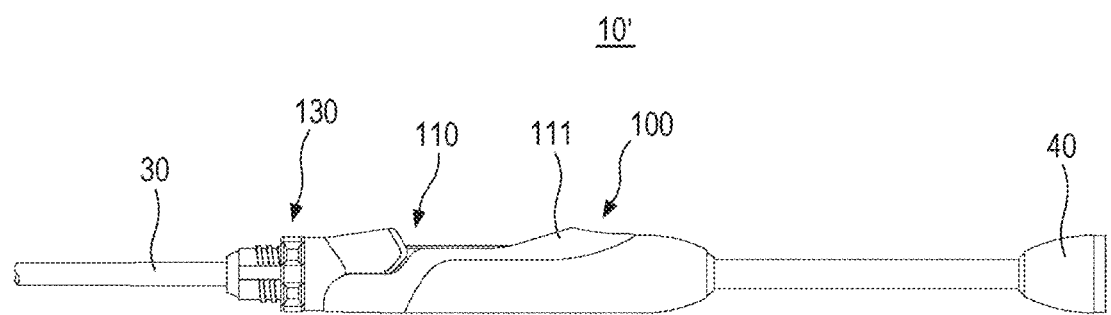
FIG. 28 is a view showing a fishing rod according to another embodiment.

FIG. 27 is a view showing a fishing rod according to one embodiment. FIG. 28 is a view showing a fishing rod 10' according to another embodiment. The fishing rods 10 and 10' may include the reel seat 100 of the present disclosure. Referring to FIG. 27, the fixed hood 111 and the movable hood assembly 130 may be arranged in a direction from a tip of the fishing rod toward a rear grip 40. Referring to FIG. 28, the movable hood assembly 130 and the fixed hood 111 may be arranged in the direction from the tip of the fishing rod 10' toward the rear grip 40.

Figure 29:
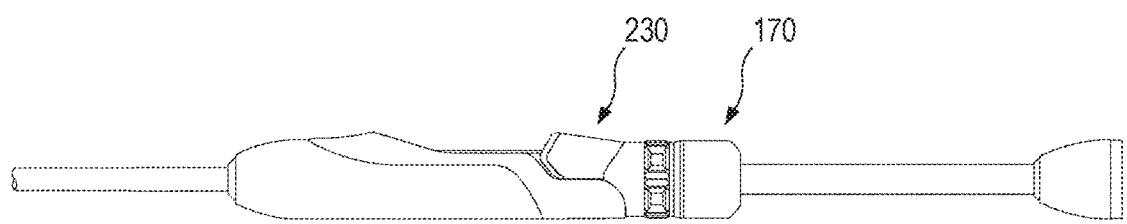
FIG. 29 is a view showing the fishing rod in which the lock nut assembly is coupled to one side of the movable hood assembly of one embodiment with reference to FIG. 27.
Figure 30:
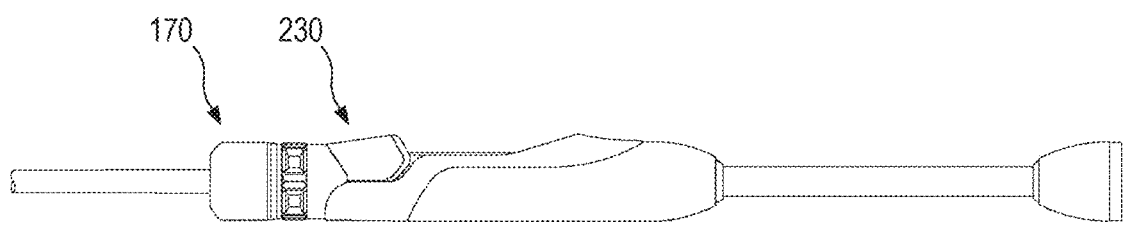
FIG. 30 is a view showing the fishing rod in which the lock nut assembly is coupled to one side of the movable hood assembly of one embodiment with reference to FIG. 28.

FIG. 29 is a view showing the fishing rod in which the lock nut assembly 170 is coupled to one side of the movable hood assembly 230 of one embodiment with reference to FIG. 27. FIG. 30 is a view showing the fishing rod in which the lock nut assembly 170 is coupled to one side of the movable hood assembly 230 of one embodiment with reference to FIG. 28.

The technical idea of the present disclosure has been described heretofore with reference to some embodiments and examples shown in the accompanying drawings. However, it is to be understood that various substitutions, modifications, and alterations may be made without departing from the technical idea and scope of the present disclosure that can be understood by those of ordinary skill in the technical field to which the present disclosure pertains. Further, it is to be understood that such substitutions, modifications, and alterations fall within the scope of the appended claims.

What is claimed is:

1. A reel seat for mounting a reel having first and second legs to a rod body of a fishing rod, the reel seat comprising:
   a seat body coupled to the rod body, configured to support the first and second legs, and including a fixed hood configured to cover the first leg;
   a movable hood coupled to the seat body so as to be movable along a central axis of the rod body in an axial direction, and configured to be moved so as to cover the second leg to fix the second leg to the seat body; and
   a nut connected to the movable hood and threadedly coupled to the seat body so as to be rotatable in a circumferential direction of the central axis,
   wherein the nut includes:
      a connection portion coupled to the movable hood so as to be rotatable in the circumferential direction;
      a manipulation portion extending from the connection portion and manipulated for rotation of the nut; and
      a plurality of concave portions disposed in the manipulation portion in the circumferential direction, and
   wherein each of the plurality of concave portions is defined by:
      a bottom surface recessed from an outer peripheral surface of the manipulation portion toward the central axis; and
      a side surface extending from an edge of the bottom surface so as to form an obtuse angle with the bottom surface.

2. The reel seat of claim 1, wherein the side surface includes a pair of first side surfaces that face each other in the circumferential direction and form an obtuse angle with the bottom surface, and a pair of second side surfaces that face each other in the axial direction and form an obtuse angle with the bottom surface.

3. The reel seat of claim 2, wherein an included angle of the pair of first side surfaces is in a range of 144 degrees to 150 degrees.

4. The reel seat of claim 1, wherein the plurality of concave portions are arranged at an equal interval along the circumferential direction.

5. The reel seat of claim 2, wherein the plurality of concave portions include five concave portions arranged at an equal interval along the circumferential direction, and an included angle of the pair of first side surfaces of the concave portions is in a range of 144 degrees to 150 degrees.

6. The reel seat of claim 1, wherein the side surface has a trapezoidal shape with an edge adjoining the bottom surface as a short parallel side.

7. The reel seat of claim 1, wherein the movable hood includes an annular portion adjacent to the nut,
wherein, when viewed in the axial direction, the bottom surface of the concave portion has a circular arc shape centered on the central axis, and
wherein a ratio of a radius of the bottom surface to an outer peripheral radius of the annular portion is in a range of 90% to 93%.

8. The reel seat of claim 1, wherein a length of the manipulation portion in the axial direction is in a range of 7 mm to 10 mm.

9. The reel seat of claim 1, wherein the movable hood includes an annular portion adjacent to the nut, and
wherein a difference between an outer peripheral radius of the manipulation portion and an outer peripheral radius of the annular portion is in a range of 0 mm to 1 mm.

10. The reel seat of claim 1, further comprising:
a lock ring disposed at one side of the nut and coupled to the seat body so as to be movable in the axial direction; and
a lock nut coupled to the lock ring so as to be rotatable in the circumferential direction and threadedly coupled to the seat body so as to be rotatable in the circumferential direction,
wherein, as the lock nut is rotated, the lock ring presses the nut toward the fixed hood in the axial direction.

11. The reel seat of claim 10, wherein a difference between an outer peripheral radius of the manipulation portion and an outer peripheral radius of the lock ring is in a range of 0 mm to 1 mm.

12. The reel seat of claim 1, wherein the nut includes a plurality of ridges each disposed between neighboring concave portions of the plurality of concave portions and arranged in the circumferential direction.

13. A fishing rod comprising:
a rod body; and
the reel seat of claim 1 coupled to the rod body.

* * * * *